(12) United States Patent
Duggal

(10) Patent No.: US 12,163,067 B2
(45) Date of Patent: *Dec. 10, 2024

(54) SEAM TAPE, ACCESSORY MATERIAL, AND COMPONENT MATERIAL WITH HOT MELT ADHESIVE FOR INFLATABLE SAFETY PRODUCTS

(71) Applicant: Air Cruisers Company, LLC, Wall Township, NJ (US)

(72) Inventor: Deepak Duggal, Wall Township, NJ (US)

(73) Assignee: Air Cruisers Company, LLC, Wall Township, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,931

(22) Filed: Dec. 22, 2022

(65) Prior Publication Data

US 2024/0209241 A1 Jun. 27, 2024

(51) Int. Cl.
*C09J 7/29* (2018.01)
*B32B 7/12* (2006.01)
(Continued)

(52) U.S. Cl.
CPC ..................... *C09J 7/35* (2018.01); *B32B 7/12* (2013.01); *B32B 15/085* (2013.01);
(Continued)

(58) Field of Classification Search
CPC .... C09J 7/22; C09J 2301/16; C09J 2400/163; C09J 7/21; C09J 7/35; C09J 2203/35; C09J 2301/12; C09J 2301/304; C09J 2400/263; B64D 25/00; B64D 25/14; B64D 25/18; D06M 17/04; D06M 2200/30; D06M 2200/35; B29C 66/5221; B29C 65/18; B29C 66/73921; B29C 66/24221; B29C 66/439; B29C 66/54; B29C 66/133;
(Continued)

(56) References Cited

U.S. PATENT DOCUMENTS

2006/0165939 A1* 7/2006 Hottner .................. B32B 27/12
156/304.3
2009/0220726 A1* 9/2009 Liggett ...................... C09J 7/29
428/411.1

(Continued)

FOREIGN PATENT DOCUMENTS

WO 9914082 A1 3/1999
WO WO-2021005083 A1 * 1/2021 ............ C09J 175/04
WO 2022039814 A2 2/2022

OTHER PUBLICATIONS

Internation Application No. PCT/US2023/084671, International Search Report and Written Opinion mailed on Apr. 4, 2024, 12 pages.

*Primary Examiner* — Patricia L. Nordmeyer
(74) *Attorney, Agent, or Firm* — Kilpatrick Townsend & Stockton LLP

(57) ABSTRACT

A seam tape, accessory material, and/or component material may be used for an inflatable safety product. The seam tape, accessory material, or component material includes a hot melt adhesive, and the hot melt adhesive adheres the seam tape, accessory material, and/or component material to a fabric or flexible material of the inflatable safety product.

26 Claims, 15 Drawing Sheets

(51) Int. Cl.
*B32B 15/085* (2006.01)
*B32B 15/088* (2006.01)
*B32B 15/09* (2006.01)
*B32B 27/32* (2006.01)
*B32B 27/34* (2006.01)
*B32B 27/36* (2006.01)
*C09J 7/24* (2018.01)
*C09J 7/35* (2018.01)

(52) U.S. Cl.
CPC ............ *B32B 15/088* (2013.01); *B32B 15/09* (2013.01); *B32B 27/32* (2013.01); *B32B 27/34* (2013.01); *B32B 27/36* (2013.01); *C09J 7/243* (2018.01); *C09J 7/29* (2018.01); *B32B 2255/06* (2013.01); *B32B 2405/00* (2013.01); *C09J 2301/304* (2020.08); *C09J 2400/16* (2013.01); *C09J 2423/046* (2013.01)

(58) Field of Classification Search
CPC ... B29C 66/729; B29C 66/0384; B29C 65/08; B29C 65/10; B29C 65/04; B29D 22/02; B29L 2031/3067; B29L 2031/5254; B29L 2031/3076; B29L 2031/485; B29L 2022/02; B63C 9/1255; B63C 9/04; B29K 2995/0067
See application file for complete search history.

(56) References Cited

U.S. PATENT DOCUMENTS

2010/0266801 A1* 10/2010 Jahoda .................. E06B 9/24
                                                            428/339
2015/0367928 A1    12/2015 Crites

* cited by examiner

SEAM TAPE, ACCESSORY MATERIAL, AND COMPONENT MATERIAL WITH HOT MELT ADHESIVE FOR INFLATABLE SAFETY PRODUCTS

FIELD OF THE INVENTION

The field of the invention relates to seam tapes, patch materials, accessory materials, and component materials and for inflatable safety products such as but not limited to inflatable evacuation slides, inflatable evacuation slide/rafts, inflatable evacuation rafts, and inflatable evacuation ramps, and inflatable evacuation slide/ramps.

BACKGROUND

Federal aviation safety regulations require aircraft to provide evacuation and other safety provisions for passengers. These include evacuation slides, evacuation slide/rafts, ramps, slide/ramps, life rafts, helicopter floats, life vests, and other life-saving inflatable devices, among others. Relevant inflatable products can also include evacuation slides, evacuation slides/rafts, evacuation ramps, evacuation slide/ramps, aviation life rafts, marine life rafts, emergency floats, emergency flotation systems, life preservers/vests, emergency flotation devices, inflatable shelters (military and nonmilitary), ship decoys and inflatable military targets, and any other flotation devices, rescue equipment, or other safety device requiring rapid inflation and/or secure air- or gas-holding functions. These inflatable devices are generally built from an assembly of inflatable tubular structures that form airbeams that are sealed to one another. Inflatable escape slides and life rafts also have non-air-holding features, such as patches, floors, sliding surfaces, girts, handles, and other features.

Typically, in order to form the tubular structures, many pieces of fabric or flexible composite material (which also may be referred to herein as panels) are joined together. Safety regulations set strength requirements for the fabric or flexible composite itself (the field of the inflatable tube), as well as strength requirements for the seam areas. In order to keep the inflation gas inside the tubes for long durations, the seams must be sealed together to make them substantially leak proof.

Traditionally, contact adhesives or contact cements with high solvent contents have been used to bond the seam tape, patch, component, and/or accessory to the fabric or flexible material of the inflatable product. However, adhesives with high solvent contents are not environmentally friendly and pose risks to the health and safety of the workplace. Moreover, the application of solvent-based contact adhesives or contact cements to bond seam tapes, patches, and/or accessories to fabrics or flexible materials requires long labor hours as well as curing time after the adhesive is applied.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seam tape, accessory material, or component material for an inflatable safety product includes a hot melt adhesive to adhere the seam tape, accessory material, or component material to a fabric or flexible composite material of the inflatable safety product.

According to various embodiments of the present invention, an inflatable safety product includes a first panel and an adjacent second panel where the first panel and the second panel forming a seam region. The inflatable safety product may include the seam tape, which joins the first panel and the second panel in the seam region.

According to certain embodiments of the present invention, a method of forming an inflatable safety product includes adhering a seam tape, accessory, or component material to at least one panel of the inflatable safety product. The seam tape, accessory, or component includes a hot melt adhesive adhering the seam tape, patch, component, or accessory to the at least one panel. The seam tape may include an emissivity of 0.48 or less.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DETAILED DESCRIPTION

Figure 1:
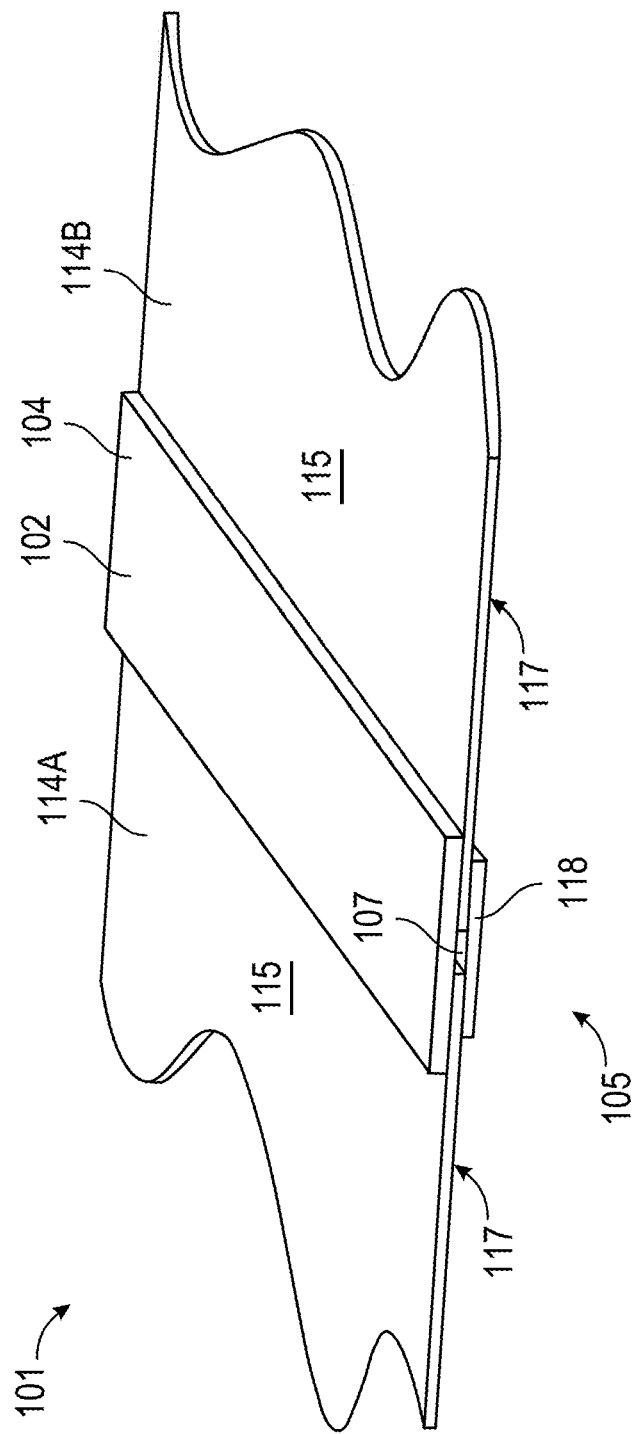
FIG. 1 illustrates a portion of an inflatable safety product with a seam tape, accessory material, or component material according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a seam tape, accessory material, or component material for inflatable safety products. While the seam tapes, patch materials, accessory materials or component materials are discussed for use with inflatable safety products, they are by no means so limited. Rather, embodiments of the seam tapes, patch materials, or accessory or component materials may be used in inflatable products of any type or otherwise as desired.

Described herein are seam tapes, patch materials, accessory materials, or component materials for inflatable safety products, and more particularly seam tapes, patch materials, accessory materials, or component materials, with hot melt adhesives for adhering the seam tapes, patch materials, accessory materials, or component materials to fabric or flexible composite materials of inflatable safety products.

In various embodiments, the fabric or flexible composite materials described herein are utilized on inflatable safety equipment that is typically deflated, folded, and compressed to fit into confined areas on aircraft doors, within an aircraft fuselage, or in an aircraft storage compartment, thereby taking up space or volume on vehicles with volume restrictions such as aircraft.

In various embodiments, the hot melt adhesives may be solvent-free and environmentally friendly compared to traditional approaches while still maintaining seam adhesion, seam shear, and gas barrier properties when exposed to a heat source, aging, hydrolysis, humidity, and/or fluids exposure. In certain embodiments, the hot melt adhesives may be solid at room temperature, and the seam tapes, patch materials, accessory materials, or component materials with the hot melt adhesives may be manufactured without requiring a liquid phase of the hot melt adhesive. As such, compared to traditional approaches that require long labor hours and curing time, the seam tapes, patch materials, accessory materials, or component materials described herein may provide manufacturing cost and time savings. In various embodiments, the hot melt adhesive may be adhered to a substrate of the seam tape, accessory material, or component material using only heat and pressure. In various embodiments, the hot melt adhesive may be adhered to a substrate of the seam tape, accessory material, or component material using only ultrasonic welding and pressure. In certain embodiments, the seam tapes, patch materials, accessory materials, or component materials described herein may have improved control over quantity and distribution of the hot melt adhesive.

In some embodiments, a method may include heating the hot melt adhesive to create a hot melt adhesive that can flow (liquid state), applying the flowing hot melt adhesive (liquid state) at the interface between a fabric, a flexible composite material, a seam tape, a patch, a component, an accessory, a girt, a floor, or a sliding surface. The method may include applying pressure in a continuous or discontinuous manufacturing process. The method may include allowing the liquefied hot melt adhesive to cool into a solid state with or without applying pressure.

In some embodiments, a method may include applying a hot melt adhesive in a flexible state or solid state at the interface between a fabric, a flexible composite material, a seam tape, a patch, a component, an accessory, a girt, a floor, or a sliding surface. The method may include applying heat and pressure in a continuous or discontinuous manufacturing process. The method may include heating the hot melt adhesive using hot air, an infrared heater, a heated wedge, a heated roller, applying radio frequency waves, applying microwaves, applying friction energy, and/or applying high-frequency ultrasonic acoustic vibrations until it is softened, liquefied, or activated. The method may include allowing the softened, liquefied, or activated hot melt adhesive to cool into a solid state with or without applying pressure.

In various embodiments, a method may include adhering a layer of hot melt adhesive to a fabric, a flexible composite material, a seam tape, a patch, a component, an accessory, a girt, a floor, or a sliding surface. The method may include applying heat and pressure in a continuous or discontinuous manufacturing process. The method may include heating the adhesive using hot air, an infrared heater, a heated wedge, a heated roller, applying radio frequency waves, applying microwaves, applying friction energy, and/or applying high-frequency ultrasonic acoustic vibrations until it is softened, liquefied, or activated. The method may include allowing the softened, liquefied, or activated hot melt adhesive to cool into a solid state with or without applying pressure.

Advantageously, the seam tapes, patch materials, accessory materials, or component materials with hot melt adhesives allow for the seam tape, accessory material, or component material to be adhered to a fabric or flexible composite material of the inflatable product having an emissivity of less than or equal to 0.48, such as less than or equal to 0.25, while maintaining seam adhesion and gas barrier properties. An emissivity of 0 would mean that the fabric or flexible composite material reflects all heat, and a temperature of the fabric or flexible composite material would not significantly change when exposed to radiant heat. Conversely, an emissivity of 1 would mean that the fabric or flexible composite material is a perfect absorber, and all the heat would be absorbed. In such embodiments, the seam tape, accessory material, or component material may be adhered to the fabric or flexible composite material with the emissivity of less than or equal to 0.48, such as less than or equal to 0.25 without needing cure time after the hot melt adhesive is applied. In some embodiments, the seam tape, accessory material, or component material may have an emissivity of less than or equal to 0.48. In certain embodiments, the seam tape, accessory material, or component material may have an emissivity of less than or equal to 0.25.

Various other advantages and benefits may be realized with the systems and methods described herein, and the aforementioned benefits should not be considered limiting.

FIG. 1 illustrates an example of a portion of an inflatable safety product 101 according to embodiments. The inflatable safety product 101 generally includes at least one fabric or flexible composite material panel 114 and a seam tape, accessory material, or component material 102. The at least one fabric or flexible composite material panel 114 generally includes an outer surface 115 and an inner surface 117, and the seam tape, accessory material, or component material 102 is adhered to at least one of the outer surfaces 115 or the inner surface 117 of the at least one fabric or flexible composite material panel 114.

In the embodiment illustrated, the inflatable safety product 101 includes two fabric or flexible composite material panels 114—a first fabric or flexible composite material panel 114A and a second fabric or flexible composite material panel 114B. In various embodiments, at least one of the fabric or flexible composite material panels 114A-B has an emissivity of less than or equal to 0.48, and in certain embodiments, at least one of the fabric or flexible composite material panels has an emissivity of less than or equal to 0.25. In some embodiments, both fabric or flexible composite material panels 114A-B have the same emissivity, although they need not in other embodiments. As a non-limiting example, both fabric or flexible composite material panels 114A-B may have an emissivity of less than or equal to 0.48, such as less than or equal to 0.25.

The fabric or flexible composite material panels 114 may have various constructions. In one non-limiting example, each fabric or flexible composite material panel 114 includes a substrate and one or more layers on the substrate. The substrate may be constructed from various materials such as but not limited to polyethylene, ultra-high molecular weight polyethylene, polypropylene, polyester, polyamide, aromatic polyamide, aramid, polyolefin, aromatic polyester, polyarylate, other liquid crystal polymers, or nylon, or other suitable substrate material, and/or any combination thereof. As additional non-limiting examples, the substrate of the fabric or flexible composite material panels 114 may be a material such as but not limited to those sold under the trade names Dyneema®, Spectra®, Innegra®, Vectran®, Technora®, Kevlar®, Nylon-6, or Nylon 6-6. The one or more layers on the substrate of the fabric or flexible composite material panels 114 includes, but is not limited to, a metallic layer, an inner layer, an exterior layer, and/or one or more adhesive and/or film layers, The metallic layer of the fabric or flexible composite material panel 114 may be a completely covering layer of the substrate of the fabric or flexible composite material panel 114, meaning that the portions of the metallic layer are interconnected even though an entirety of the at least one surface of the substrate of the fabric or flexible composite material panel 114 is not necessarily covered. The metallic layer of the fabric or flexible composite material panel 114 may include various metals or metallic elements as desired, including but not limited to aluminum, an aluminum alloy, titanium, a titanium alloy, nickel, a nickel alloy, brass, a brass alloy, steel, a steel alloys, stainless steel or a stainless steel alloy, silver, a silver alloy, combinations thereof, or any other suitable metal or metallic alloy. In other non-limiting examples, the metallic layer of the fabric or flexible composite material panel 114 includes other types of metallic elements, such as titanium, zinc, and the like, or metallic alloys such as titanium alloys, zinc alloys, and the like.

In some embodiments, the metallic layer of the fabric or flexible composite material panel 114 is an outermost layer of the fabric or flexible composite material panel 114, although in other embodiments, the metallic layer is not an outermost layer of the or flexible composite material fabric or flexible composite material panel 114. As a non-limiting example, a protective top layer and/or other type of top layer as desired (not illustrated) may be the outermost layer and may be positioned on the metallic layer of the fabric or flexible composite material panel 114. Optionally, and when included, the protective top layer may include a thin film layer, coating or other suitable layer that can prevent damage, inhibit corrosion, and/or inhibit oxidation of the metallic layer of the fabric or flexible composite material panel 114. In another embodiment, the exterior layer may prevent deterioration due to hydrolysis. In another embodiment, the metallic layer of the fabric or flexible composite material panel 114 is covered by an exterior layer to promote adhesion to seam tapes, girt materials, floor materials, sliding surface materials, patch materials, accessory materials, component materials, or other materials or components. In another embodiment, the metallic layer of the fabric or flexible composite material panel 114 is covered by an exterior layer to increase the durability of the metallic layer, fabric, or flexible composite material. In some embodiments, the protective top layer optionally includes a passivation layer, a parkerized layer, or other suitable layer that may be formed via a controlled oxidation process. When included, the exterior layer of the fabric or flexible composite material panel 114 may be various types of materials as desired. In one non-limiting example, the exterior layer of the fabric or flexible composite material panel 114 may be an acrylic coating, although in other embodiments other suitable materials may be utilized as desired. Optionally, and when included, the exterior layer of the fabric or flexible composite material panel 114 may include a thin film layer, coating, or other suitable layer.

The inner layer of the fabric or flexible composite material panel 114 may provide an air-tight or gas-tight seal for the fabric or flexible composite material or flexible composite material panel 114 and may be constructed from various materials. As non-limiting examples, the inner layer of the fabric or flexible composite material panel 114 may include a plastic-based layer, a urethane-based layer, a metallic layer, or any other suitable layer for allowing the inflatable safety product 101 to be inflated with air or other gases.

In some embodiments, at least one of the fabric or flexible composite material panels 114A-B optionally includes a metallic layer, and the seam tape, accessory material, or component material 102 is adhered to the metallic layer as discussed in detail below. In various embodiments, at least one of the fabric or flexible composite material panels 114A-B optionally includes a non-metallic surface, and the seam tape, accessory material, or component material 102 is adhered to the non-metallic surface. The non-metallic surface may include, but is not limited to, an acrylic, nylon, polyolefin, modified polyolefin, polyurethane, vinyl, polyethylene (PE), polypropylene (PP), polyamide (PA), fluoropolymer, polyethylene terephthalate (PET), polystyrene, ethylene vinyl acetate (EVOH), polyvinylidene chloride (PVDC), polycarbonate (PC), polyvinyl chloride (PVC), polylactic acid (PLA), polyvinyl alcohol (PVOH), ethylene-chlorotrifluoroethylene, polyetherketone (PEK), polyetheretherketone (PEEK), polyetherketoneketone (PEKK), or any combination thereof, or any other suitable material wherein the hot melt adhesive adheres the seam tape, accessory material, or component material to the metallic and/or non-metallic surface of the fabric or flexible composite material.

In the embodiment illustrated in FIG. 1, the seam tape, accessory material, or component material 102 is provided as a seam tape 104. In this example, the seam tape 104 is provided to join a seam region 105 (e.g., a butt seam) formed by the first fabric or flexible composite material panel 114A and the second fabric or flexible composite material panel 114B. As illustrated in FIG. 1, a gap 107 may be formed between the fabric or flexible composite material panels 114A-B, and the seam tape 104 may cover the gap 107. Optionally, an air holding film 118 is provided in the seam region 105 and on a surface of the panels 114A-B opposite from the seam tape 104. While the seam tape 104 is illustrated on the outer surface 115, it need not be in other embodiments. Moreover, while a single seam tape 104 is illustrated, any number of seam tapes 104 and/or other seam tape, accessory material, or component material 102 may be provided on the outer surface 115 and/or the inner surface 117 of one or more panels 114 as desired. Moreover, while the seam tape, accessory material, or component material 102 is illustrated as the seam tape 104 for the inflatable product 101, as previously mentioned, in other embodiments, the seam tape, accessory material, or component material 102 may be provided as an accessory material and/or a component material, such as but not limited to a patch, girt, handle, structural attachment, or pouch.

Figure 2:
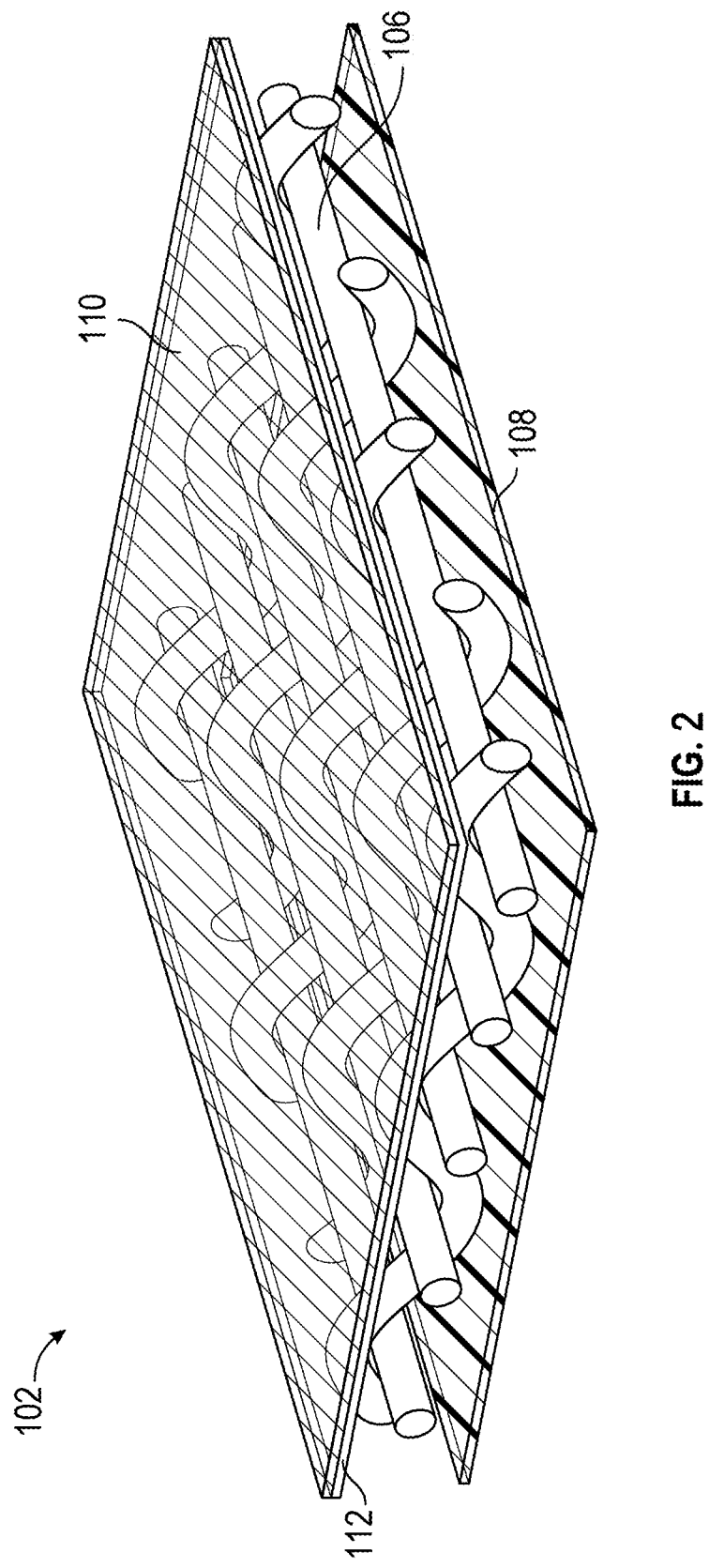
FIG. 2 is a cross-sectional view of the seam tape, accessory material, or component material of FIG. 1.

Referring to FIG. 2, the seam tape, accessory material, or component material 102 is illustrated in greater detail. As illustrated in FIG. 2, the seam tape, accessory material, or component material 102 generally includes a substrate 106 and a hot melt adhesive 108.

The substrate 106 may be various flexible composite or fabric materials as desired. As non-limiting examples, the substrate 106 may include polyethylene, ultra-high molecular weight polyethylene, polypropylene, polyester, polyamide, aromatic polyamide, aramid, polyolefin, aromatic polyester, polyarylate, other liquid crystal polymers, or nylon, other suitable substrate material, and/or any combination thereof or any combination thereof. As additional non-limiting examples, the substrate 106 may be a material such as but not limited to those sold under the trade names Dyneema®, Spectra®, Innegra®, Vectran®, Technora®, Kevlar®, Nylon-6, or Nylon 6-6. In one non-limiting example, the substrate 106 is a polyester substrate or a polyamide substrate. In other non-limiting example, the substrate 106 is a polyethylene substrate or a polypropylene substrate. In certain embodiments, the substrate 106 may be, but does not have to be, similar to a material of the substrate of the fabric or flexible composite material panel(s) 114.

The hot melt adhesive 108 may be various hot melt adhesives for adhering the seam tape, accessory material, or component material 102 to the fabric or flexible composite material panel(s) 114. In certain embodiments, the hot melt adhesive 108 may be a thermoplastic hot melt adhesive, a thermoset hot melt adhesive, or a reactive hot melt adhesive.

In some embodiments, the hot melt adhesive is a reactive hot melt adhesive that can be either polyurethane (PUR) hot melts or silane-modified polyolefin (POR) adhesives, that have a two-stage curing profile, physical setting and chemical crosslinking curing stage. In some embodiments, the hot melt adhesive is a reactive hot melt adhesive that can be moisture-curing hot melt. Optionally, the moisture-curing hot melt adhesive is solvent-free.

In various embodiments, the hot melt adhesive 108 is a solvent-free hot melt adhesive, such as but not limited to a solvent-free thermoplastic hot melt adhesive and/or a solvent-free thermoset hot melt adhesive and/or a solvent-free reactive hot melt adhesive. In various embodiments, the hot melt adhesive 108 may be solid at room temperature, and the seam tape, accessory material, or component material 102 with the hot melt adhesives may be adhered to the fabric or flexible composite material panel(s) 114 without requiring a liquid phase of the hot melt adhesive and/or using only heat and pressure. In some embodiments, the hot melt adhesive 108 may be a copolymer, polyolefin, polyamide, nylon, low density polyethylene, high density polyethylene ethylene vinyl acetate, polyester, polyurethane, ester-based polyurethane, ether-based polyurethane, urethane prepolymer, reactive polyurethane, or any other suitable material. In various embodiments, the hot melt adhesive 108 may contain a material that is similar or dissimilar to the materials to which it is adhered.

The seam tape, accessory material, or component material 102 with the hot melt adhesives may be adhered to the fabric or flexible composite material panel(s) 114 using various techniques. In some embodiments, the seam tape, accessory material, or component material 102 is adhered using heat and pressure. In various embodiments, the seam tape, accessory material, or component material 102 is adhered using ultrasonic welding or high-frequency sound waves and pressure. In certain embodiments, the seam tape, accessory material, or component material 102 is adhered using radio frequency welding or high-frequency electromagnetic energy and pressure.

The seam tape, accessory material, or component material 102 with the hot melt adhesives may be adhered to the fabric or flexible composite material panel(s) 114 while maintaining seam adhesion and/or gas barrier properties when exposed to a heat source, aging, or fluids exposure.

In various embodiments, the hot melt adhesive 108 adheres the seam tape, accessory material, or component material 102 to the fabric or flexible composite material panel(s) 114 having the emissivity of less than or equal to 0.48. In various embodiments, the hot melt adhesive 108 adheres the seam tape, accessory material, or component material 102 to the fabric or flexible composite material panel(s) 114 having the emissivity of less than or equal to 0.25. In certain embodiments, the hot melt adhesive 108 adheres the seam tape, accessory material, or component material 102 to a metallic layer of the fabric or flexible composite material panel(s) 114 and/or to a non-metallic layer of the fabric or flexible composite material panel(s) 114. In certain embodiments, the hot melt adhesive 108 adheres the seam tape, accessory material, or component material 102 to an exterior layer, coating, or film covering the metallic layer of the fabric or flexible composite material panel(s) 114. 114. In certain embodiments, the hot melt adhesive 108 adheres the seam tape, accessory material, or component material 102 to a non-metallic layer of the fabric or flexible composite material panel(s) 114.

In various embodiments, seam tapes, patch materials, component materials, and accessory materials for inflatable safety products with epoxy adhesive described herein are utilized on inflatable safety equipment that is typically deflated, folded, and compressed to fit into confined areas on aircraft doors, within an aircraft fuselage, or in an aircraft storage compartment, thereby taking up space or volume on vehicles with volume restrictions such as aircraft.

In certain embodiments, the seam tape, accessory material, or component material 102 with the hot melt adhesive 108 has an emissivity of less than or equal to 0.48. In other words, when subjected to radiative heat, the seam tape, accessory material, or component material 102 may reflect about 50% of the heat. In some embodiments, the seam tape, accessory material, or component material 102 with the hot melt adhesive 108 has an emissivity of less than or equal to 0.25.

In addition to the substrate 106 and the hot melt adhesive 108, the seam tape, accessory material, or component material 102 may have various other layers, as will be discussed in detail below. Such additional layers may be provided on the substrate 106 on a surface opposite from the hot melt adhesive 108, between the hot melt adhesive 108 and the substrate 106, and various combinations thereof.

In the example of FIG. 2, in addition to the hot melt adhesive 108 and the substrate 106, the seam tape, accessory material, or component material 102 includes a metallic layer 110 and an adhesive layer and/or film layer 112 between the metallic layer 110 and the substrate 106.

The metallic layer 110 at least partially covers at least one surface of the substrate 106 and/or the adhesive layer and/or film layer 112. As such, while the following description makes reference to the metallic layer 110 being positioned on the surface of the substrate 106, it is by no means limited, and the description is equally applicable to the metallic layer 110 being positioned on the adhesive layer and/or film layer 112.

In various embodiments, the metallic layer 110 includes various metals or metallic elements as desired, including but not limited to aluminum, aluminum alloys, titanium, titanium alloys, nickel, nickel alloys brass, brass alloys, steel, steel alloys, silver, silver alloys, stainless steel, stainless steel alloys, combinations thereof, and/or any other suitable metal or metallic elements as desired.

In some embodiments, the metallic layer 110 is a thermoplastic polyurethane coating with metallic elements or particles dispersed within the coating. In one non-limiting example, the metallic layer 110 is a thermoplastic polyurethane coating with aluminum particles dispersed within the thermoplastic polyurethane coating. In such embodiments, the metallic layer 110 with dispersed metallic elements or particles may be considered a discontinuous metallic layer. In other embodiments, and as illustrated in FIG. 2, the metallic elements or particles are provided as a covering layer (completely covering layer or discontinuously covering layer) of the seam tape, accessory material, or component material 102. A continuously covering layer refers to a metallic layer in which the portions of the metallic layer 110 are interconnected even though an entirety of the at least one surface of the substrate 106 is not necessarily covered. In other embodiments, the metallic layer 110 may be discontinuous and/or provided at discrete locations covering at least one surface of the substrate 106. The metallic layer 110 may be deposited on, adhered to, and/or otherwise positioned on the substrate 106 using various techniques as desired. As a non-limiting example, the metallic layer 110 may be printed on the substrate 106, may be adhered to the substrate 106 via epoxies or other adhering materials, may be deposited on the substrate 106, may be vapor-deposited on the substrate 106, or the like. In some embodiments, the metallic layer 110 is plated on the substrate 106, sputtered on the substrate, or the like. In some embodiments, the metallic layer 110 is a metallic foil layer adhered to the substrate 106.

In certain embodiments, the metallic layer 110 with the dispersed metallic particles in the thermoplastic polyurethane coating optionally may provide a different emissivity compared to the metallic layer 110 provided as a continuous and/or completely covering layer. In some embodiments, the emissivity of the metallic layer 110 with dispersed metallic particles in the thermoplastic polyurethane coatings has an emissivity of less than or equal to 0.48, and the metallic layer 110 provided as a continuous and/or completely covering layer may have an emissivity of less than or equal to 0.25. As such, the seam tape, accessory material, or component material 102 described herein may include a tailored emissivity to reflect heat as desired when subjected to radiative heat. With the emissivity of less than or equal to 0.48, the seam tape, accessory material, or component material 102 may maintain adhesion and gas barrier properties when exposed to radiant heat.

In certain embodiments, the type of metallic layer 110 (e.g., dispersed metallic particles or provided as a completely covering layer) may depend on the material used as the substrate 106. As non-limiting examples, the dispersed metallic particles in a thermoplastic or thermoset coating may be utilized as the metallic layer 110 for substrates formed of materials having relatively increased melting points, and the metallic layer 110 provided as a completely covering layer may be utilized for substrates formed of materials having relatively decreased melting point. As a non-limiting example, a polyamide substrate or a polyester substrate may include the metallic layer 110 formed of the dispersed metallic particles in the thermoplastic or thermoset coating, and a polyethylene substrate or a polypropylene substrate may include the metallic layer 110 as a completely covering layer.

In some embodiments, the metallic layer 110 may form an outermost layer of the seam tape, accessory material, or component material 102. However, in other embodiments, and as discussed in detail below with regards to FIGS. 9 and 10, it need not be, and the metallic layer 110 optionally may be covered by an exterior layer (and the exterior layer is an outermost layer). When included, the exterior layer may be various types of materials as desired, and in certain embodiments the exterior layer may protect the metallic layer 110. In one non-limiting example, the exterior layer may be an acrylic coating, although in other embodiments other suitable materials may be utilized as desired. Optionally, and when included, the exterior layer may include a thin film layer, coating, or other suitable layer that may minimize and/or prevent oxidation or corrosion of the metallic layer 110 and deterioration of the fabric or flexible composite material due to hydrolysis. In some embodiments, the exterior layer optionally includes a passivation layer, a parkerized layer, or other suitable layer that may be formed via a controlled oxidation process.

Referring to the adhesive layer and/or film layer 112, the number and location of the adhesive layers and/or film layers 112 illustrated in FIG. 2 is for illustrative purposes only and should not be considered limiting.

The adhesive layer and/or film layer 112 may include, but is not limited to, an acrylic, nylon, polyolefin, modified polyolefin, polyurethane, vinyl, polyethylene (PE), polypropylene (PP), polyamide (PA), fluoropolymer, polyethylene terephthalate (PET), polystyrene, ethylene vinyl acetate (EVOH), polyvinylidene chloride (PVDC), polycarbonate (PC), polyvinyl chloride (PVC), polylactic acid (PLA), polyvinyl alcohol (PVOH), ethylene-chlorotrifluoroethylene, polyetherketone (PEK), polyetheretherketone (PEEK), polyetherketoneketone (PEKK), or any combination thereof, or any other suitable material.

In various embodiments, a fabric or flexible composite material according to embodiments may include an adhesive layer, a film layer, or both an adhesive layer and a film layer. The adhesive layer and/or film layer 112 may be an adhesive layer and/or film, and when included, may facilitate adhering of the metallic layer 110 to the substrate 106. As a non-limiting example, the adhesive layer and/or film layer 112 may be deposited on, attached to, or otherwise positioned on the substrate 106, and the metallic layer 110 may be deposited on, plated on, sputtered on, attached to, or otherwise positioned on the adhesive layer and/or film layer 112. In other examples, and discussed below with reference to FIGS. 3-14, a plurality of adhesive layers and/or film layers 112 may be utilized. In such embodiments, each adhesive layer and/or film layer 112 may be an adhesive layer, a film layer, or both.

Optionally, the seam tape, accessory material, or component material 102 includes an inner layer between the hot melt adhesive 108 and the substrate 106. When included, the inner layer may provide an air-tight or gas-tight seal for the seam tape, accessory material, or component material 102. The inner layer may be constructed from various materials or combinations of materials as desired. As non-limiting examples, the inner layer may be a plastic-based layer, a urethane-based layer, a metallic layer, combinations thereof, and/or any other suitable layer allowing the seam tape, accessory material, or component material 102 to be inflated with air or other gases.

Figure 3:
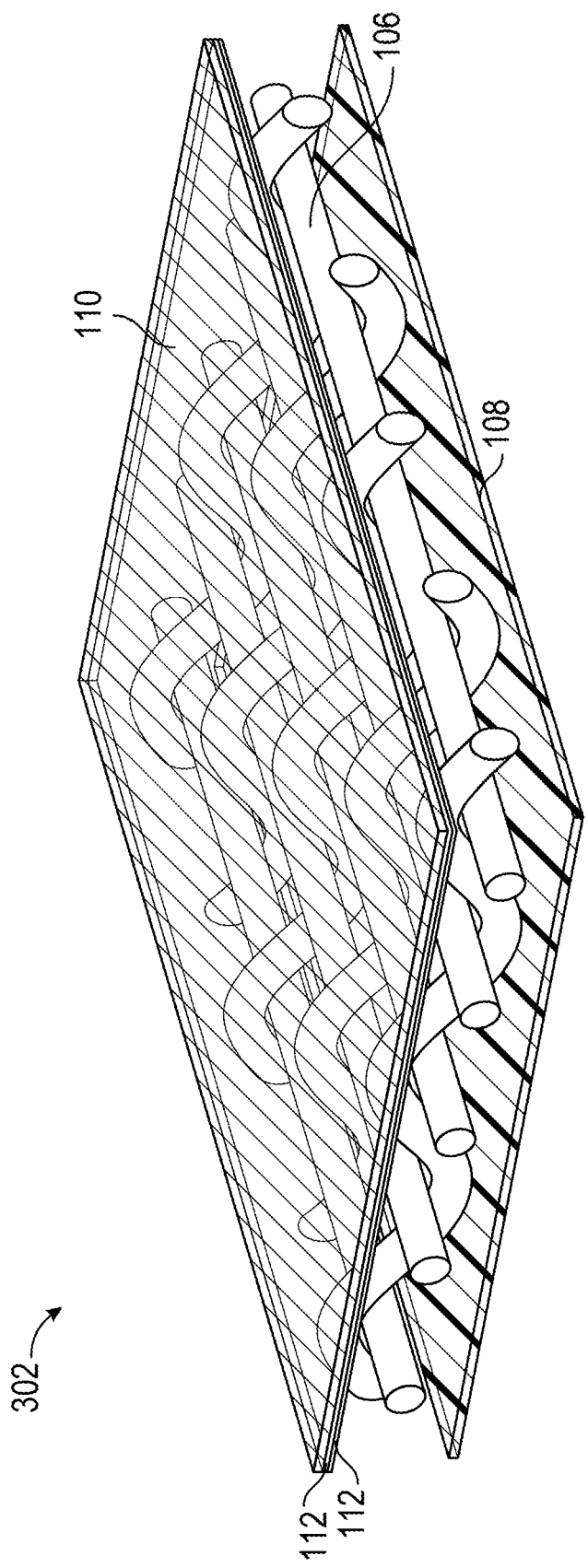
FIG. 3 is a cross-sectional view of a seam tape, accessory material, or component material according to certain embodiments of the present invention.

FIG. 3 illustrates another example of a seam tape, accessory material, or component material 302 that is substantially similar to the seam tape, component material, or accessory material 102 except that the seam tape, accessory material, or component material 302 includes two adhesive layers and/or film layers 112 between the metallic layer 110 and the substrate 106. In this example, each adhesive layer and/or film layer 112 may be an adhesive layer, a film layer, or both.

Figure 4:
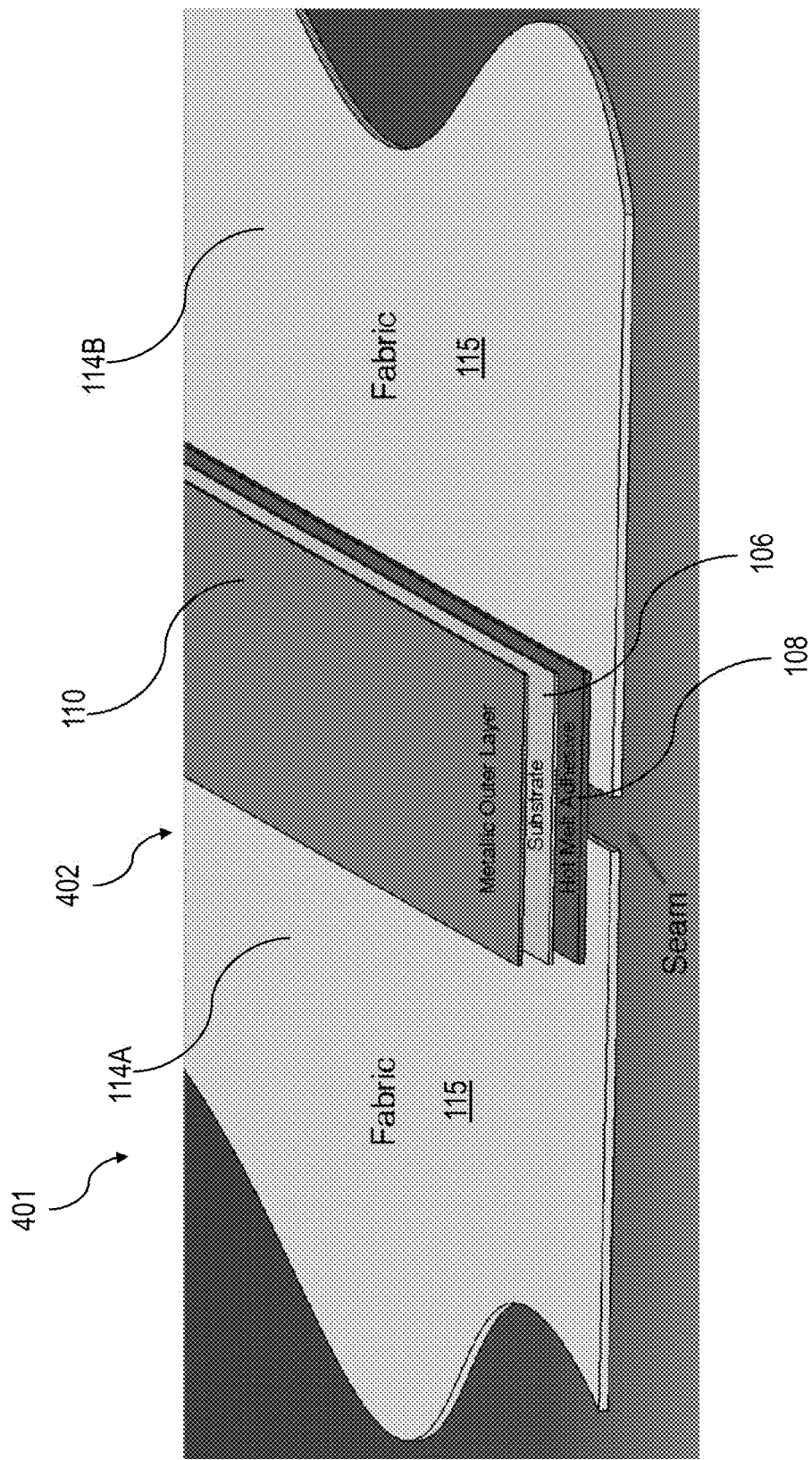
FIG. 4 is an exploded view of an inflatable safety product with a seam tape, accessory material, or component material according to certain embodiments of the present invention.

FIG. 4 illustrates another example of an inflatable safety product 401 according to embodiments. The inflatable safety product 401 is similar to the inflatable safety product 101 and includes a seam tape, accessory material, or component material 402 adhered to one or more fabric or flexible composite material panels 114. The seam tape, accessory material, or component material 402 is similar to the seam tape, accessory material, or component material 102 except that the seam tape, accessory material, or component material 402 omits the adhesive layer and/or film layer 112, and the stack of layers forming the seam tape, accessory material, or component material 402 includes the substrate 106, the hot melt adhesive 108 on one side of the substrate 106, and the metallic layer 110 on a side of the substrate 106 opposite from the hot melt adhesive 108. In FIG. 4, the seam tape, accessory material, or component material 402 is illustrated as being adhered to the outer surface 115 of the fabric or flexible composite material panels 114.

Figure 5:
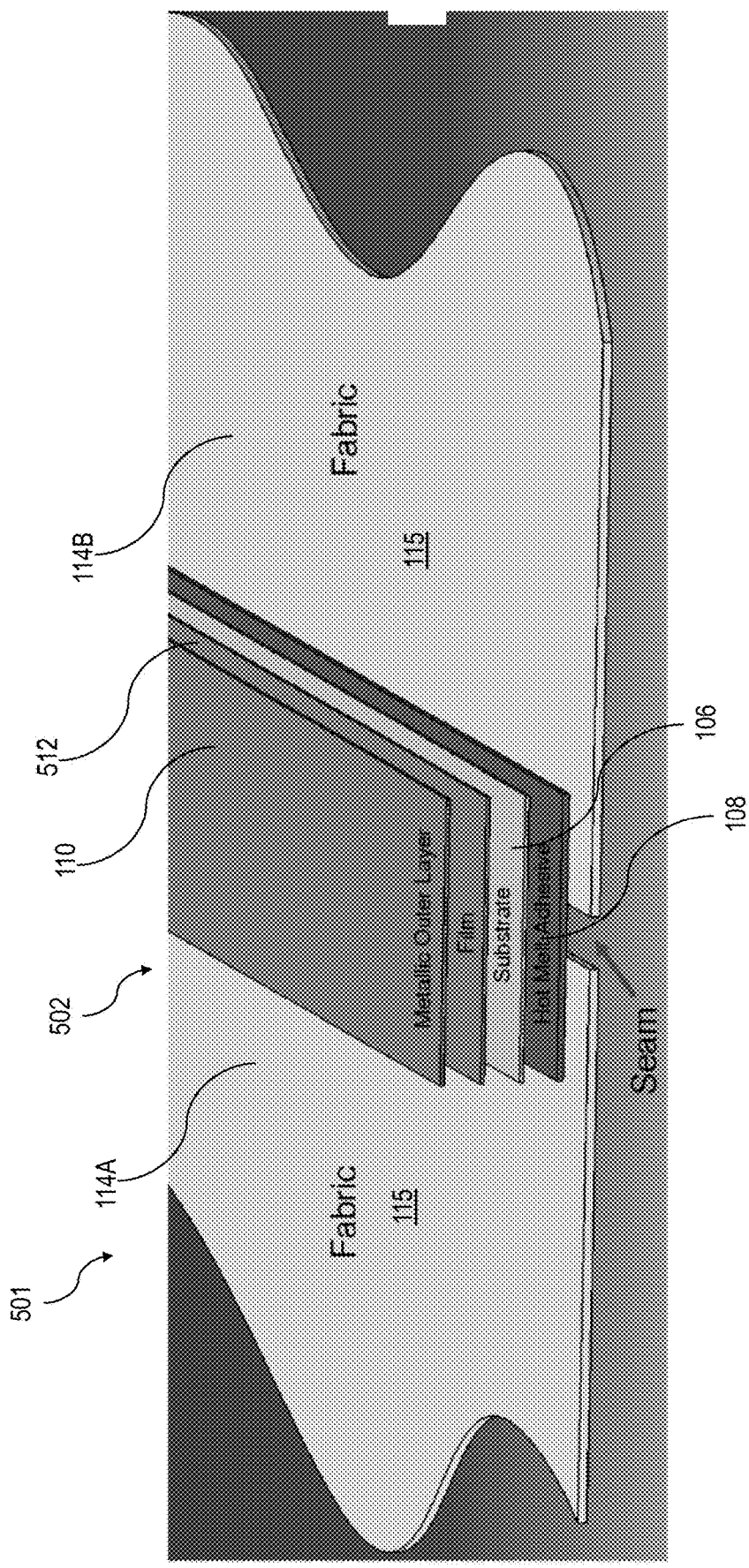
FIG. 5 is an exploded view of an inflatable safety product with a seam tape, accessory material, or component material according to certain embodiments of the present invention.

FIG. 5 illustrates another example of an inflatable safety product 501 according to embodiments. The inflatable safety product 501 is similar to the inflatable safety product 101 and includes a seam tape, accessory material, or component material 502 adhered to one or more fabric or flexible composite material panels 114. The seam tape, accessory material, or component material 502 is similar to the seam tape, accessory material, or component material 102 except that the seam tape, accessory material, or component material 502 includes a film layer 512 (adhesive layer and/or film layer 112), and the stack of layers forming the seam tape, accessory material, or component material 502 includes the substrate 106, the hot melt adhesive 108 on one side of the substrate 106, the metallic layer 110 on a side of the substrate 106 opposite from the hot melt adhesive 108, and the film layer 512 between the metallic layer 110 and the substrate 106. In FIG. 5, the seam tape, accessory material, or component material 502 is illustrated as being adhered to the outer surface 115 of the fabric or flexible composite material panels 114.

Figure 6:
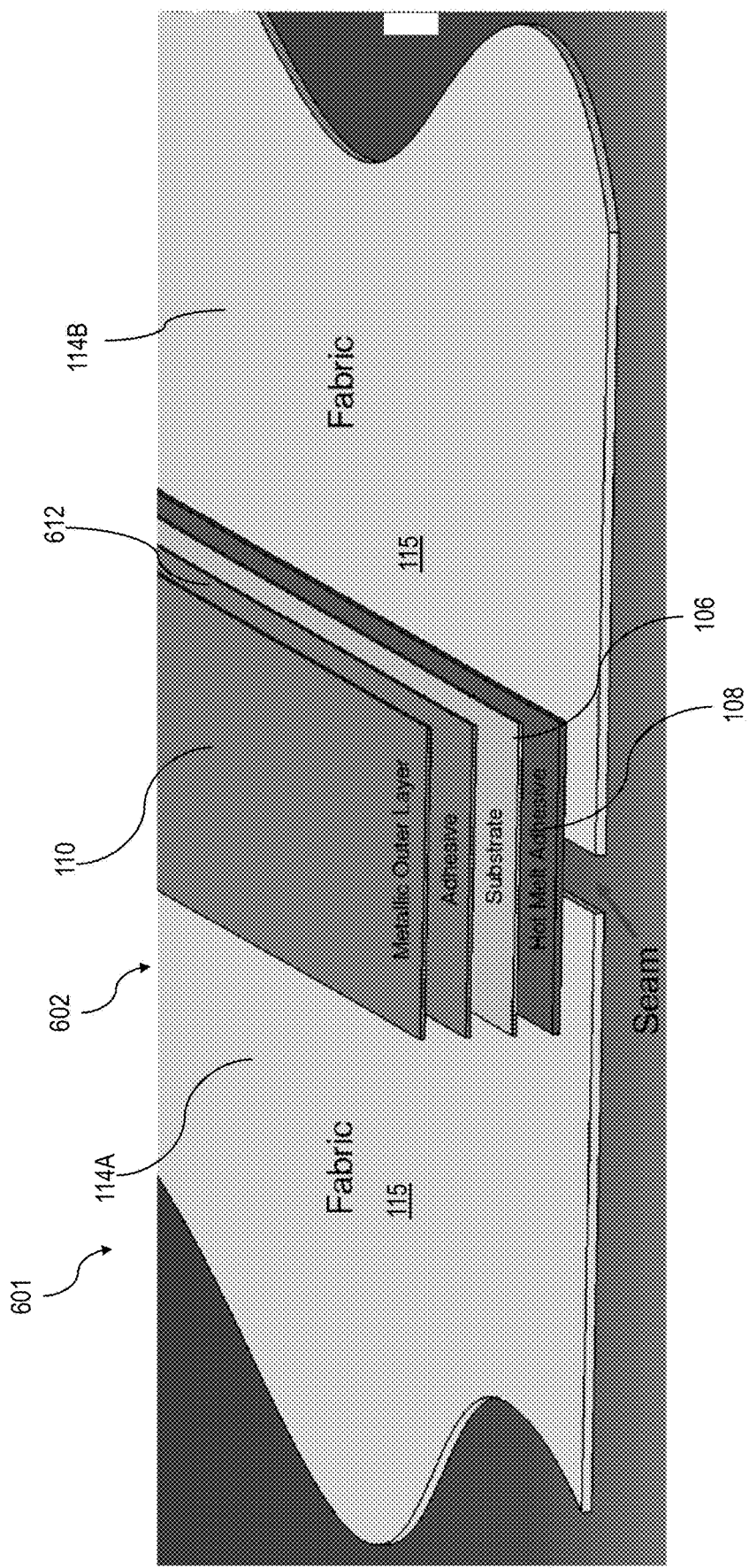
FIG. 6 is an exploded view of an inflatable safety product with a seam tape, accessory material, or component material according to certain embodiments of the present invention.

FIG. 6 illustrates another example of an inflatable safety product 601 according to embodiments. The inflatable safety product 601 is similar to the inflatable safety product 101 and includes a seam tape, accessory material, or component material 602 adhered to one or more fabric or flexible composite material panels 114. The seam tape, accessory material, or component material 602 is similar to the seam tape, accessory material, or component material 102 except that the seam tape, accessory material, or component material 602 includes an adhesive layer 612 (similar to the adhesive layer and/or film layer 112). In this example, the stack of layers forming the seam tape, accessory material, or component material 602 includes the substrate 106, the hot melt adhesive 108 on one side of the substrate 106, the metallic layer 110 on a side of the substrate 106 opposite from the hot melt adhesive 108, and the adhesive layer 612 between the metallic layer 110 and the substrate 106. In FIG. 6, the seam tape, accessory material, or component material 602 is illustrated as being adhered to the outer surface 115 of the fabric or flexible composite material panels 114.

Figure 7:
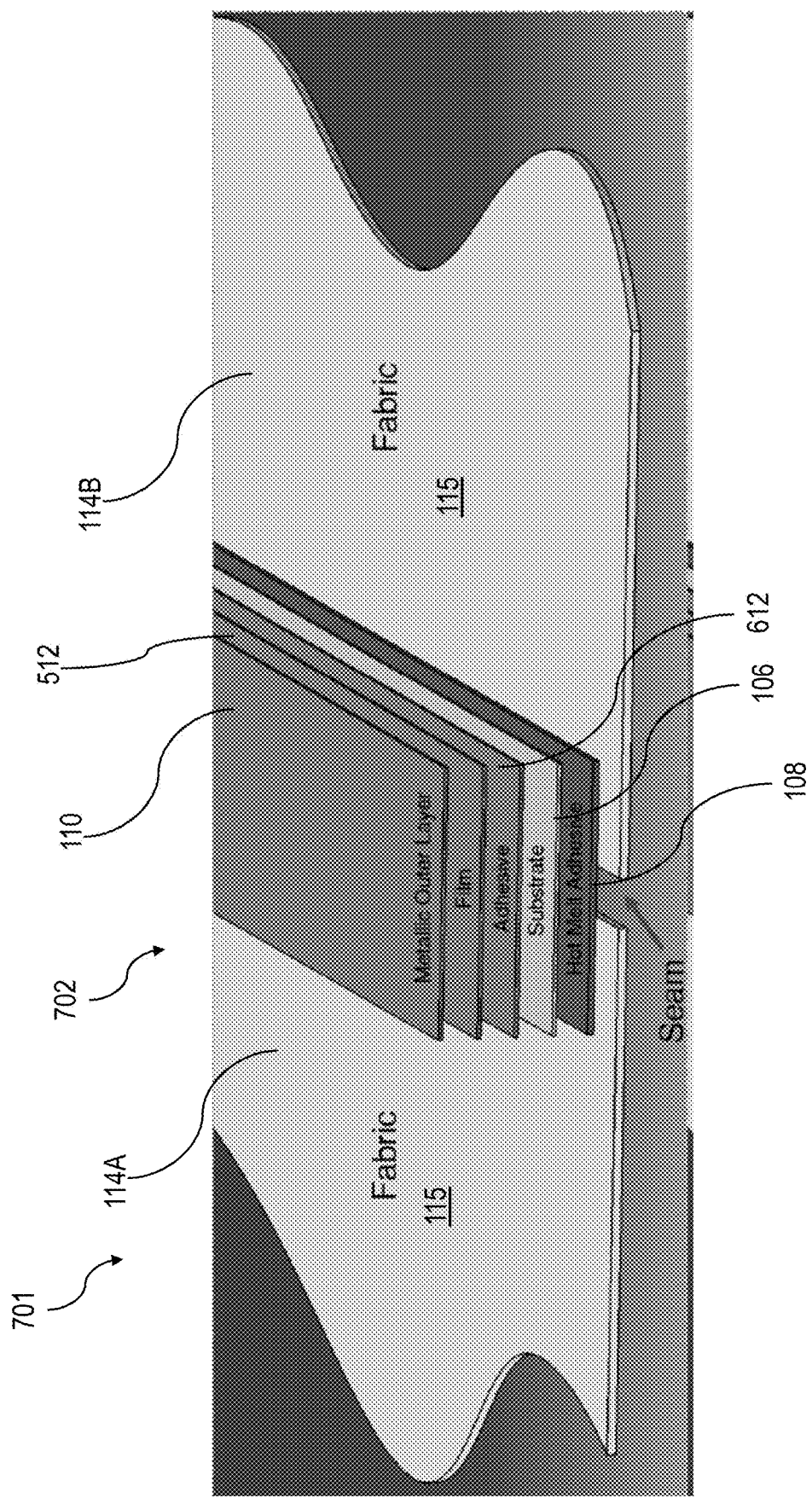
FIG. 7 is an exploded view of an inflatable safety product with a seam tape, accessory material, or component material according to certain embodiments of the present invention

FIG. 7 illustrates another example of an inflatable safety product 701 according to embodiments. The inflatable safety product 701 is similar to the inflatable safety product 101 and includes a seam tape, accessory material, or component material 702 adhered to one or more fabric or flexible composite material panels 114. The seam tape, accessory material, or component material 702 is similar to the seam tape, accessory material, or component material 102 except that the seam tape, accessory material, or component material 702 includes two adhesive layer and/or film layers 112 where one is the adhesive layer 612 and the other is the film layer 512. In this example, the stack of layers forming the seam tape, accessory material, or component material 702 includes the substrate 106, the hot melt adhesive 108 on one side of the substrate 106, the metallic layer 110 on a side of the substrate 106 opposite from the hot melt adhesive 108, and the film layer 512 between the metallic layer 110 and the substrate 106, and the adhesive layer 612 between the film layer 512 and the substrate 106. In FIG. 7, the seam tape, accessory material, or component material 702 is illustrated as being adhered to the outer surface 115 of the fabric or flexible composite material panels 114.

Figure 8:
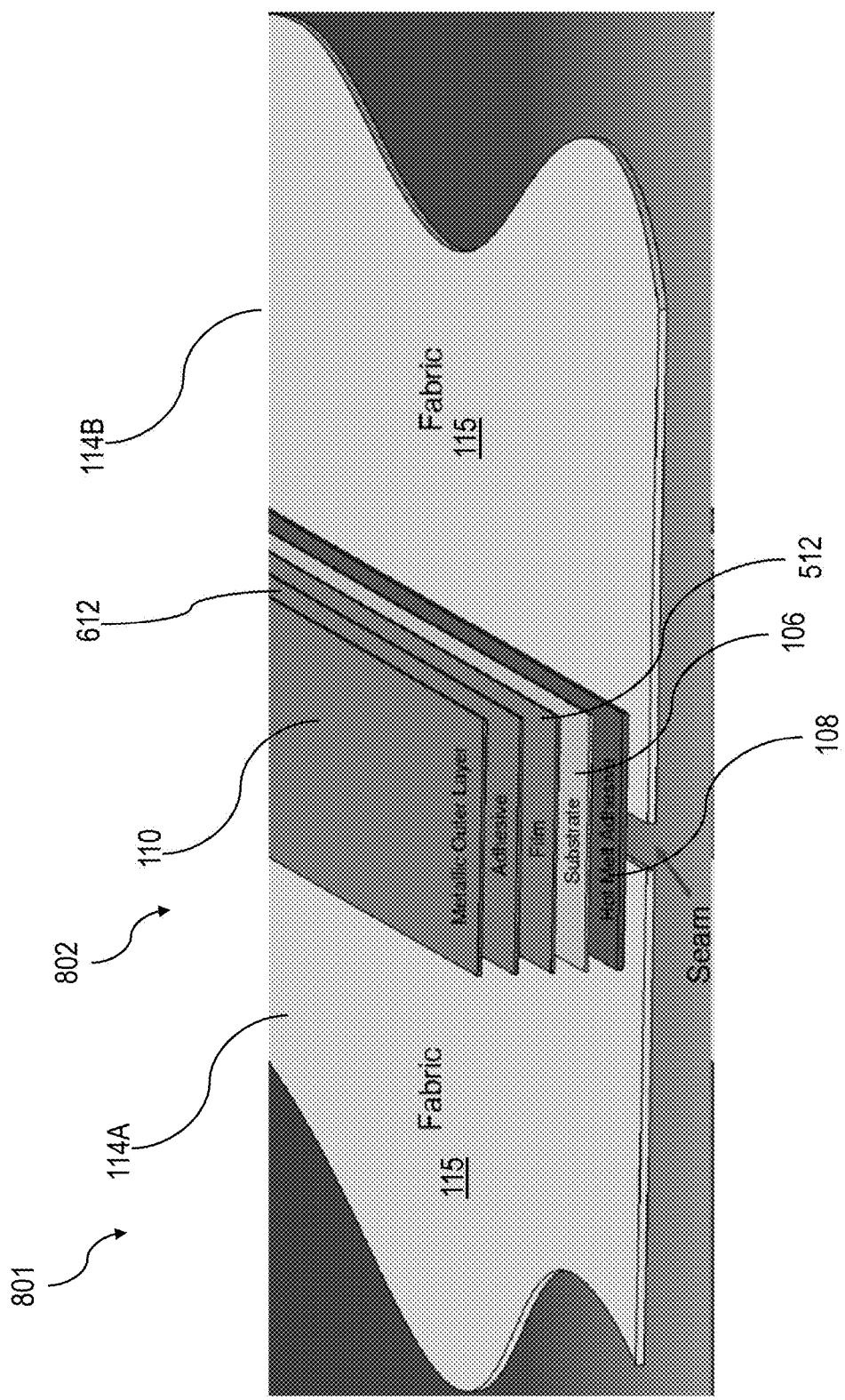
FIG. 8 is an exploded view of an inflatable safety product with a seam tape, accessory material, or component material according to certain embodiments of the present invention.

FIG. 8 illustrates another example of an inflatable safety product 801 according to embodiments. The inflatable safety product 801 is similar to the inflatable safety product 101 and includes a seam tape, accessory material, or component material 802 adhered to one or more fabric or flexible composite material panels 114. The seam tape, accessory material, or component material, 802 is similar to the seam tape, accessory material, or component material 102 except that the seam tape, accessory material, or component material 802 includes two adhesive layer and/or film layers where one is the adhesive layer 612 and the other is the film layer 512. In this example, the stack of layers forming the seam tape, accessory material, or component material 702 includes the substrate 106, the hot melt adhesive 108 on one side of the substrate 106, the metallic layer 110 on a side of the substrate 106 opposite from the hot melt adhesive 108, and the film layer 512 between the metallic layer 110 and the substrate 106, and the adhesive layer 612 between the film layer 512 and the metallic layer 110. In FIG. 8, the seam tape, accessory material, or component material 702 is illustrated as being adhered to the outer surface 115 of the fabric or flexible composite material panels 114.

Figure 9:
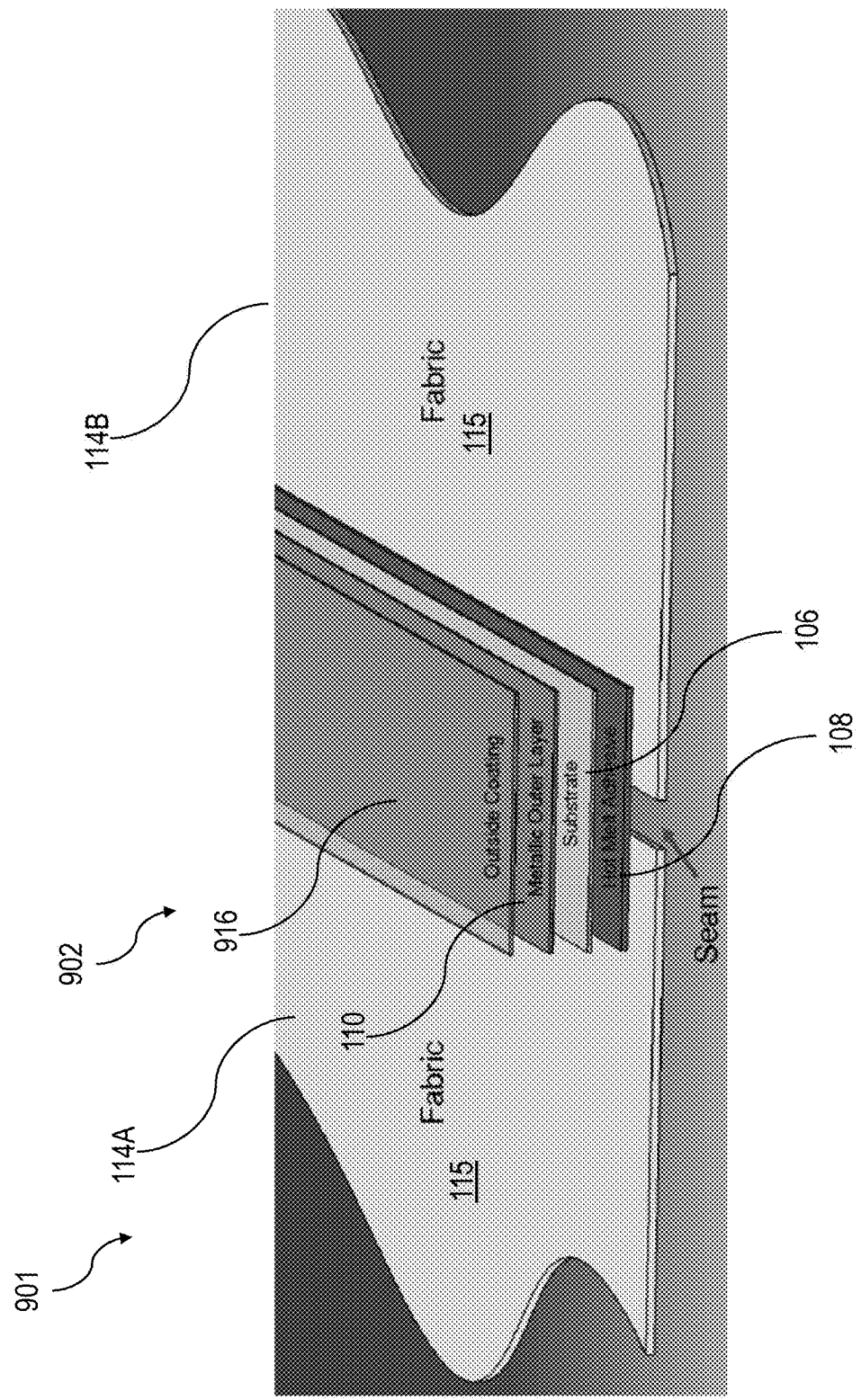
FIG. 9 is an exploded view of an inflatable safety product with a seam tape, accessory material, or component material according to certain embodiments of the present invention.

FIG. 9 illustrates another example of an inflatable safety product 901 according to embodiments. The inflatable safety product 901 is similar to the inflatable safety product 101 and includes a seam tape, accessory material, or component material 902 adhered to one or more fabric or flexible composite material panels 114. The seam tape, accessory material, or component material 902 is similar to the seam tape, accessory material, or component material 102 except that the seam tape, accessory material, or component material 902 includes a top layer 916. In this example, the stack of layers forming the seam tape, accessory material, or component material 902 includes the substrate 106, the hot melt adhesive 108 on one side of the substrate 106, the metallic layer 110 on a side of the substrate 106 opposite from the hot melt adhesive 108, and the top layer 916 on the metallic layer 110. As previously mentioned, the top layer 916 may include a thin film layer, coating, or other suitable layer that can prevent damage, inhibit corrosion, and/or inhibit oxidation, may minimize or prevent deterioration due to hydrolysis, may promote adhesion to seam tapes, girt materials, floor materials, sliding surface materials, patch materials, accessory materials, component materials, or other materials or components, may increase the durability of the metallic layer, fabric, or flexible composite material, etc. In FIG. 9, the seam tape, accessory material, or component material 902 is illustrated as being adhered to the outer surface 115 of the fabric or flexible composite material panels 114.

Figure 10:
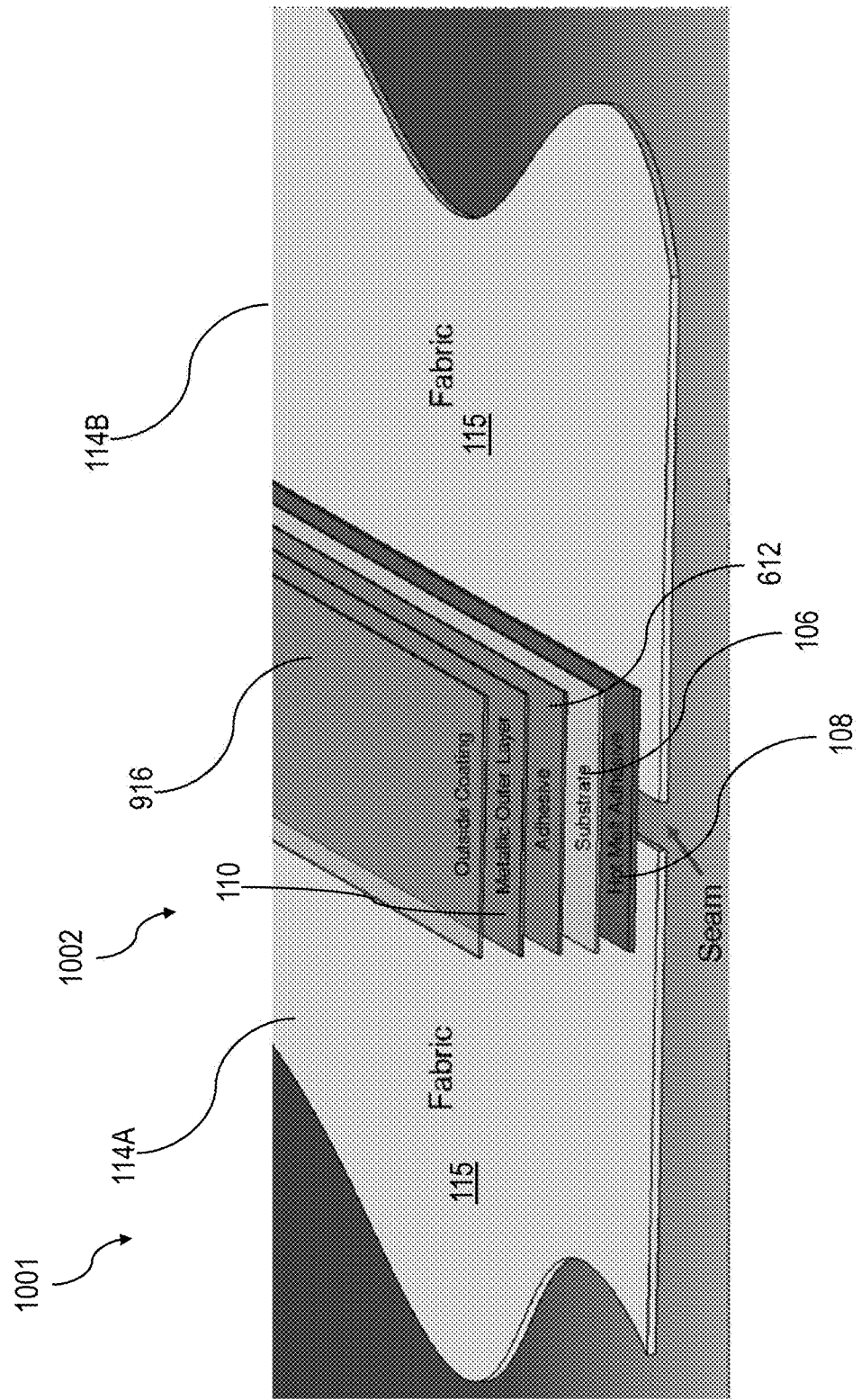
FIG. 10 is an exploded view of an inflatable safety product with a seam tape, accessory material, or component material according to certain embodiments of the present invention.

FIG. 10 illustrates another example of an inflatable safety product 1001 according to embodiments. The inflatable safety product 1001 is similar to the inflatable safety product 601 and includes a seam tape, accessory material, or component material 1002 adhered to one or more fabric or flexible composite material panels 114. The seam tape, accessory material, or component material 1002 is similar to the seam tape, accessory material, or component material 602 except that the seam tape, accessory material, or component material 1002 additionally includes the adhesive layer 612. In this example, the stack of layers forming the seam tape, accessory material, or component material 1002 includes the substrate 106, the hot melt adhesive 108 on one side of the substrate 106, the metallic layer 110 on a side of the substrate 106 opposite from the hot melt adhesive 108, the top layer 916 on the metallic layer 110, and the adhesive layer 612 between the metallic layer 110 and the substrate 106. In FIG. 10, the seam tape, accessory material, or component material 1002 is illustrated as being adhered to the outer surface 115 of the fabric or flexible composite material panels 114.

Figure 11:
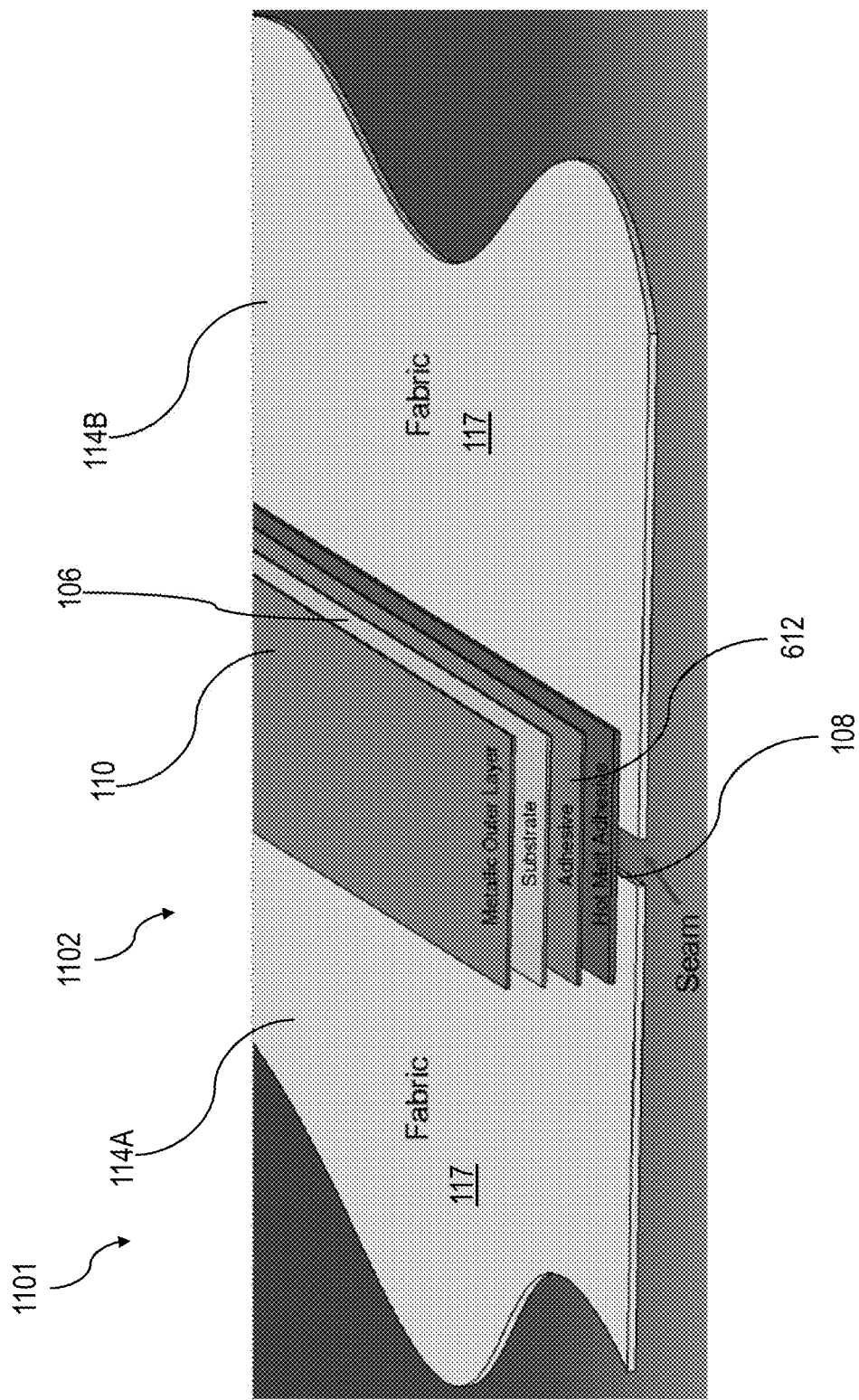
FIG. 11 is an exploded view of an inflatable safety product with a seam tape, accessory material, or component material according to certain embodiments of the present invention.

FIG. 11 illustrates another example of an inflatable safety product 1101 according to embodiments. The inflatable safety product 1101 is similar to the inflatable safety product 101 and includes a seam tape, accessory material, or component material 1102 adhered to one or more fabric or flexible composite material panels 114. The seam tape, accessory material, or component material 1102 is similar to the seam tape, accessory material, or component material 102 except that the seam tape, accessory material, or component material 1102 includes the adhesive layer 612. In this example, the stack of layers forming the seam tape, accessory material, or component material 1102 includes the substrate 106, the hot melt adhesive 108 on one side of the substrate 106, the metallic layer 110 on a side of the substrate 106 opposite from the hot melt adhesive 108, and the adhesive layer 612 between the hot melt adhesive 108 and the substrate 106. In FIG. 11, the seam tape, accessory material, or component material 1102 is illustrated as being adhered to the inner surface 117 of the fabric or flexible composite material panels 114.

Figure 12:
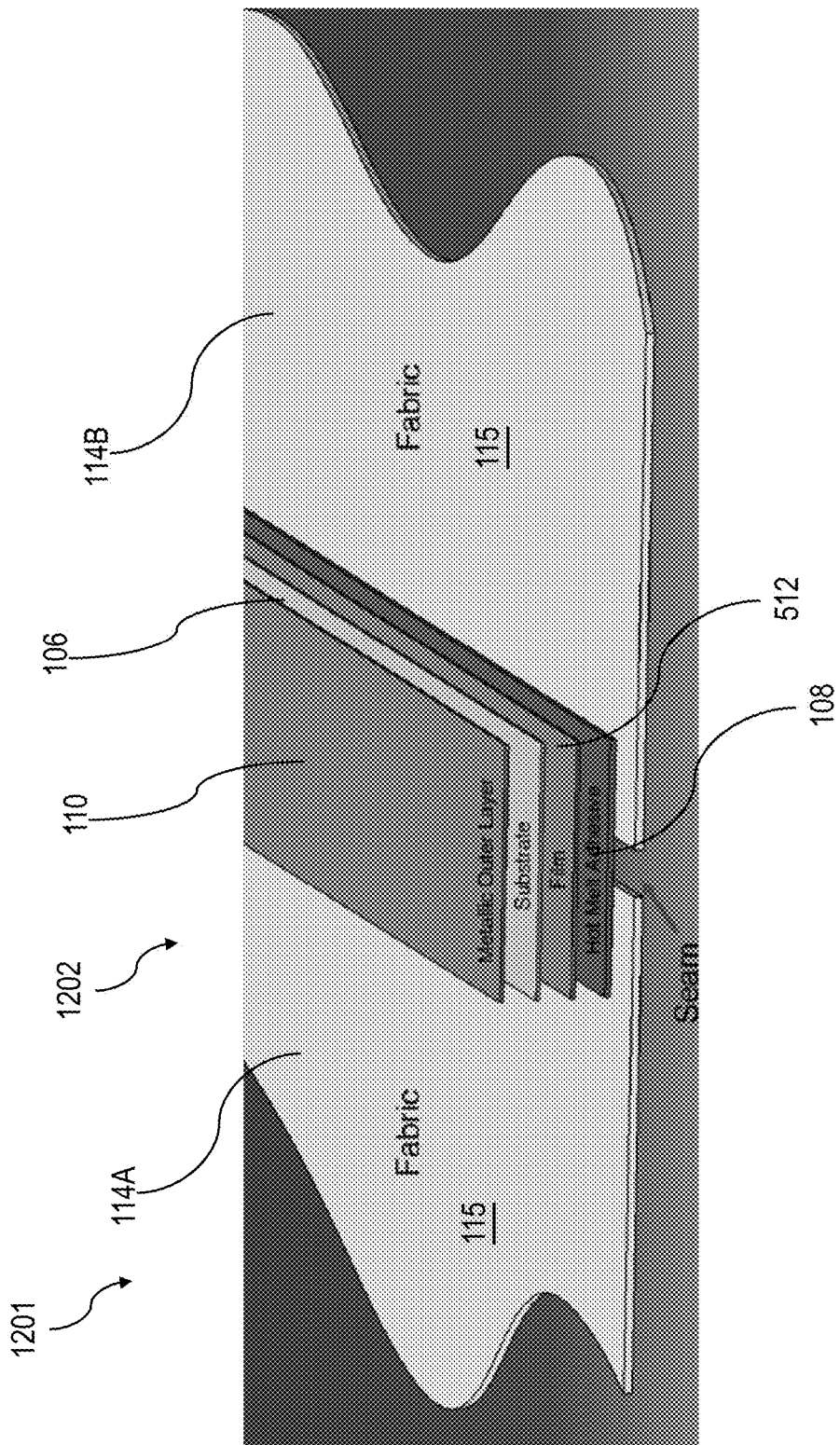
FIG. 12 is an exploded view of an inflatable safety product with a seam tape, accessory material, or component material according to certain embodiments of the present invention.

FIG. 12 illustrates another example of an inflatable safety product 1201 according to embodiments. The inflatable safety product 1201 is similar to the inflatable safety product 101 and includes a seam tape, accessory material, or component material 1202 adhered to one or more fabric or flexible composite material panels 114. The seam tape, accessory material, or component material 1202 is similar to the seam tape, accessory material, or component material 102 except that the seam tape, accessory material, or component material 1202 includes the film layer 512. In this example, the stack of layers forming the seam tape, accessory material, or component material 1202 includes the substrate 106, the hot melt adhesive 108 on one side of the substrate 106, the metallic layer 110 on a side of the substrate 106 opposite from the hot melt adhesive 108, and the film layer 512 between the hot melt adhesive 108 and the substrate 106. In FIG. 12, the seam tape, accessory material, or component material 1202 is illustrated as being adhered to the outer surface 115 of the fabric or flexible composite material panels 114.

Figure 13:
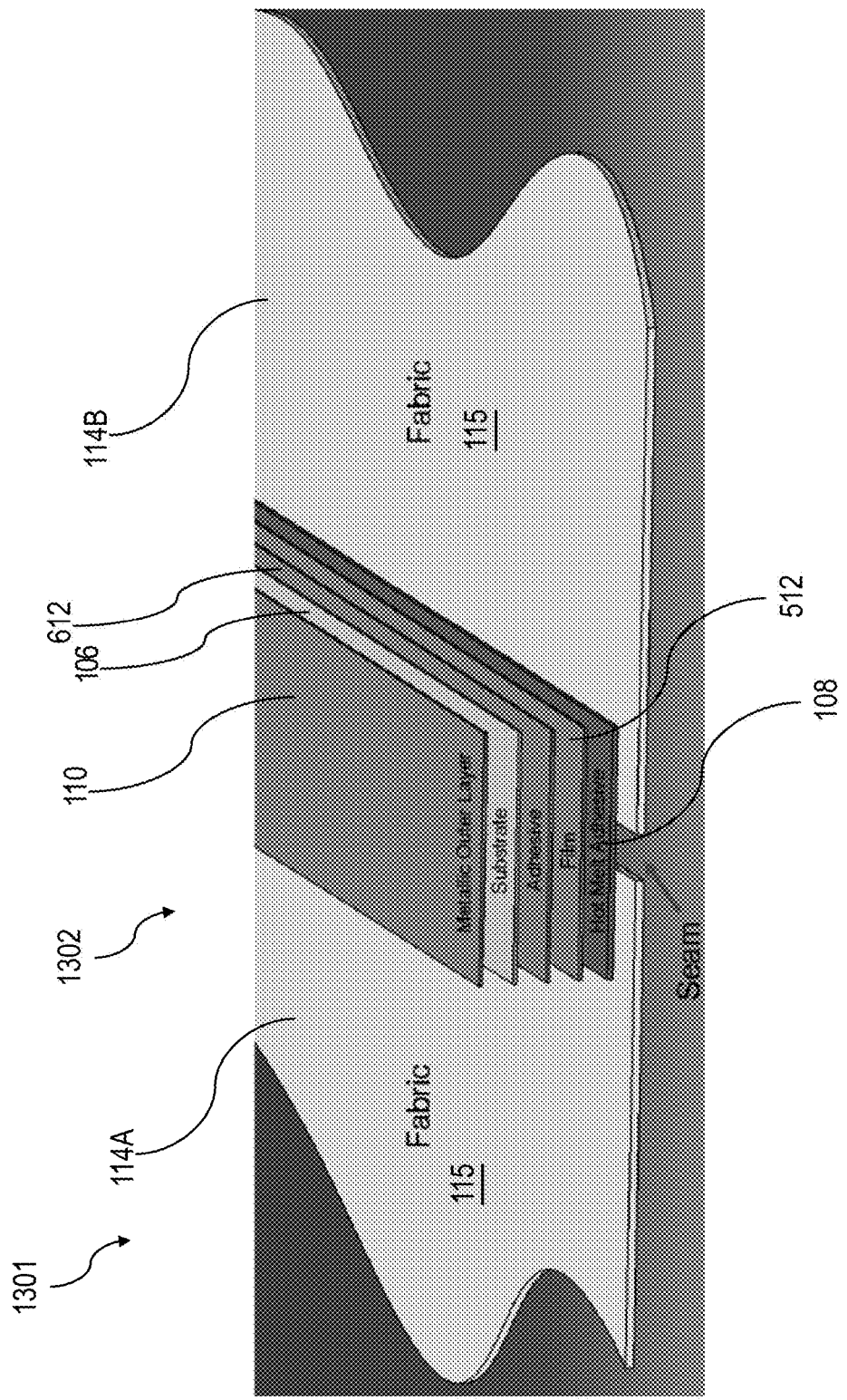
FIG. 13 is an exploded view of an inflatable safety product with a seam tape, accessory material, or component material according to certain embodiments of the present invention.

FIG. 13 illustrates another example of an inflatable safety product 1301 according to embodiments. The inflatable safety product 1301 is similar to the inflatable safety product 101 and includes a seam tape, accessory material, or component material 1302 adhered to one or more fabric or flexible composite material panels 114. The seam tape, accessory material, or component material 1302 is similar to the seam tape, accessory material, or component material 102 except that the seam tape, accessory material, or component material 1302 includes the film layer 512 and the adhesive layer 612. In this example, the stack of layers forming the seam tape, accessory material, or component material 1302 includes the substrate 106, the hot melt adhesive 108 on one side of the substrate 106, the metallic layer 110 on a side of the substrate 106 opposite from the hot melt adhesive 108, the film layer 512 between the hot melt adhesive 108 and the substrate 106, and the adhesive layer 612 between the film layer 512 and the substrate 106. In FIG. 13, the seam tape, accessory material, or component material 1302 is illustrated as being adhered to the outer surface 115 of the fabric or flexible composite material panels 114.

Figure 14:
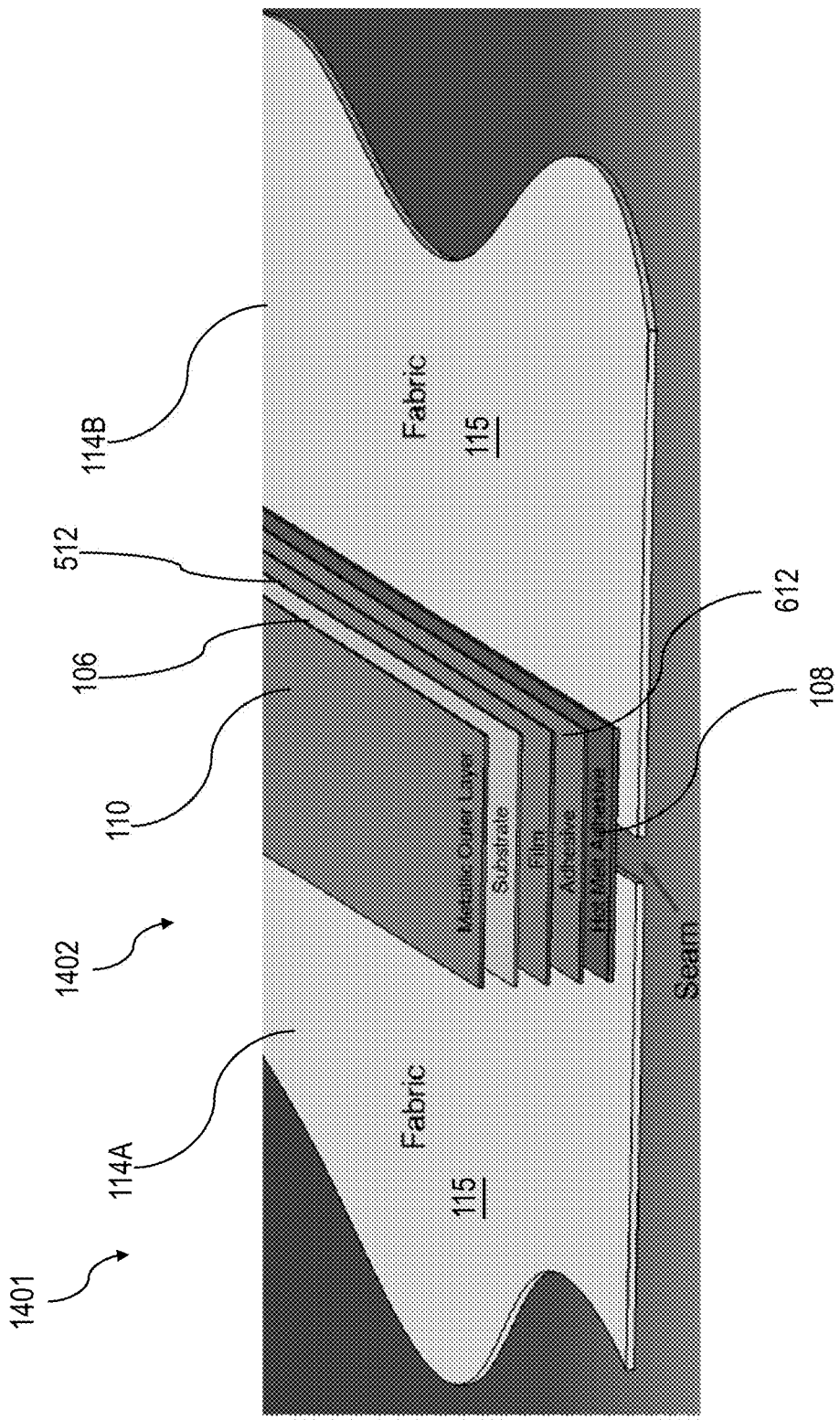
FIG. 14 is an exploded view of an inflatable safety product with a seam tape, accessory material, or component material according to certain embodiments of the present invention.

FIG. 14 illustrates another example of an inflatable safety product 1401 according to embodiments. The inflatable safety product 1401 is similar to the inflatable safety product 101 and includes a seam tape, accessory material, or component material 1402 adhered to one or more fabric or flexible composite material panels 114. The seam tape, accessory material, or component material 1402 is similar to the seam tape, accessory material, or component material 102 except that the seam tape, accessory material, or component material 1402 includes the film layer 512 and the adhesive layer 612. In this example, the stack of layers forming the seam tape, accessory material, or component material 1402 includes the substrate 106, the hot melt adhesive 108 on one side of the substrate 106, the metallic layer 110 on a side of the substrate 106 opposite from the hot melt adhesive 108, the film layer 512 between the hot melt adhesive 108 and the substrate 106, and the adhesive layer 612 between the film layer 512 and the hot melt adhesive 108. In FIG. 14, the seam tape, accessory material, or component material 1402 is illustrated as being adhered to the outer surface 115 of the fabric or flexible composite material panels 114.

Figure 15:
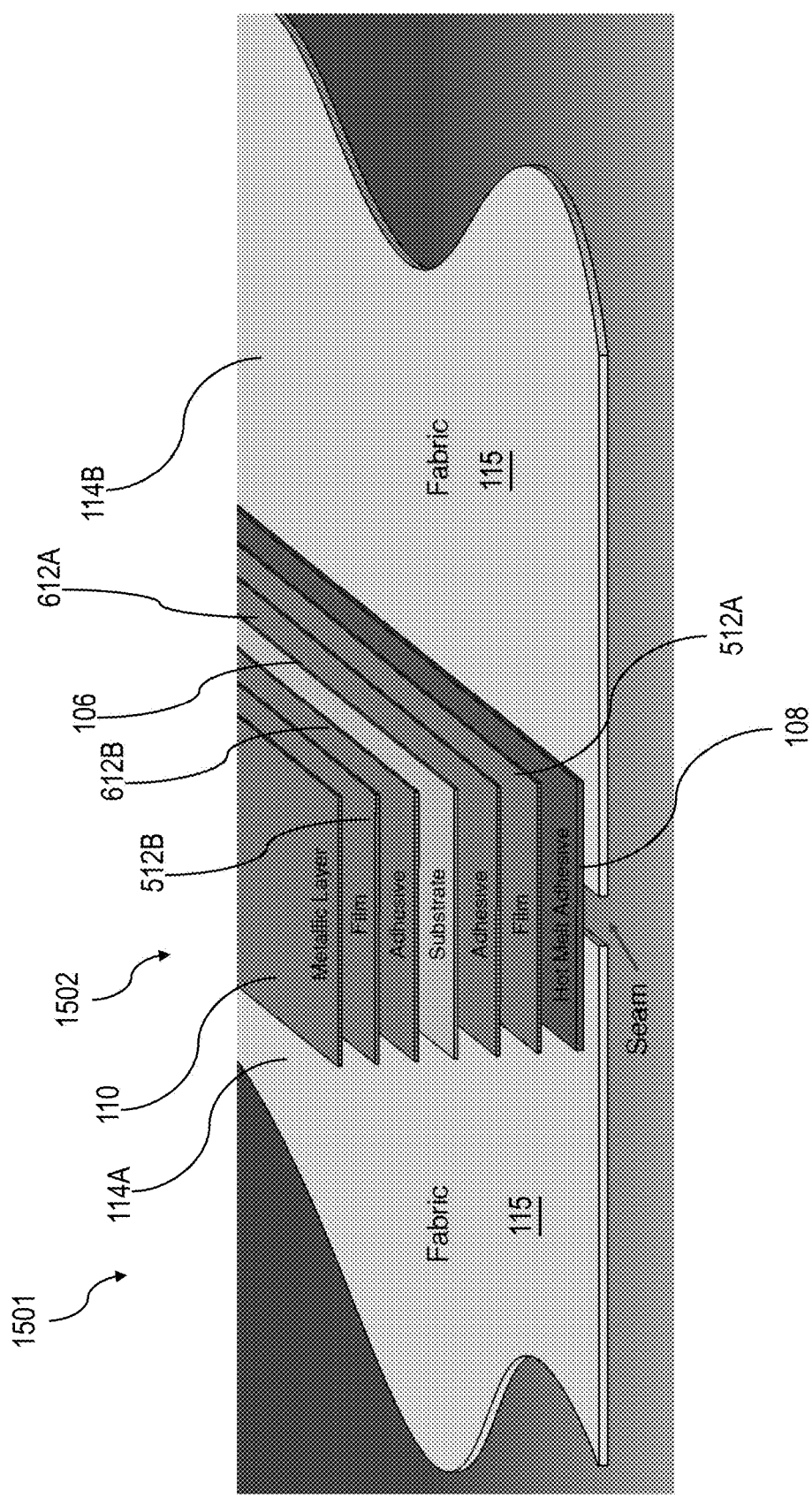
FIG. 15 is an exploded view of an inflatable safety product with a seam tape, accessory material, or component material according to certain embodiments of the present invention.

FIG. 15 illustrates another example of an inflatable safety product 1501 according to embodiments. The inflatable safety product 1501 is similar to the inflatable safety product 101 and includes a seam tape, accessory material, or component material 1502 adhered to one or more fabric or flexible composite material panels 114. The seam tape, accessory material, or component material 1402 is similar to the seam tape, accessory material, or component material 102 except that the seam tape, accessory material, or component material 1402 includes a plurality of film layers 512 and a plurality of adhesive layers 612. In this example, the stack of layers forming the seam tape, accessory material, or component material 1502 includes the substrate 106, the hot melt adhesive 108 on one side of the substrate 106, the metallic layer 110 on a side of the substrate 106 opposite from the hot melt adhesive 108, a first film layer 512A between the hot melt adhesive 108 and the substrate 106, a first adhesive layer 612A between the first film layer 512A and the hot melt adhesive 108, a second film layer 512B between the substrate 106 and the metallic layer 110, and a second adhesive layer 612B between the substrate 106 and the second film layer 512B. In FIG. 15, the seam tape, accessory material, or component material 1502 is illustrated as being adhered to the outer surface 115 of the fabric or flexible composite material panels 114.

In other examples, the above embodiments of the seam tape, accessory material, or component material can be adhered to the inner surface of the inflatable safety product panel or panels. These examples may be used with or without the metallic layer.

As mentioned, the seam tapes, patch materials, or accessory materials, or component materials described herein may be used for various inflatable products and/or accessories for inflatable products as desired. As non-limiting examples, the material described herein may be a material for a seam tape joining panels of an inflatable safety product such as but not limited to an inflatable evacuation slide, inflatable evacuation slide/raft, inflatable evacuation ramp, inflatable evacuation slide/ramp, inflatable life raft, inflatable life vest, or inflatable helicopter float, among others. As another non-limiting example, the material described herein may be material for an accessory or component such as but not limited to a patch, girt, handle, structural attachment, or pouch.

FAA Requirements

In various embodiments, the fabric or flexible composite material described herein may meet and/or exceeds the fabric or flexible composite material requirements according to TSO-C69c from the Federal Aviation Administration (FAA), entitled EMERGENCY EVACUATION SLIDES, RAMPS, RAMP/SLIDES, AND SLIDE RAFTS and published Aug. 18, 1999 ("TSO-C69c") (incorporated herein by reference), TSO-C13f from the FAA, entitled LIFE PRESERVERS and published Sep. 24, 1992 ("TSO-C13f") (incorporated herein by reference), and/or TSO-C70b from the FAA, entitled LIFE RAFTS and published Aug. 4, 2014 ("TSO-C70b") (incorporated herein by reference).

Required tests include: seam peel strength, seam shear strength, tensile strength (grab test), tear strength (trapezoid test), tear strength (tongue test), ply adhesion, coat adhesion, temperature resistance, radiant heat resistance, puncture strength, tear propagation, chafe resistance, flammability (vertical burn rate), pressure retention, permeability, porosity (hydrolysis), hydrolysis conditioning, resistance to hydrolysis, fluids exposure, and accelerated aging Seam Adhesion TSO-C69c Requirement As a non-limiting example, the fabric or flexible composite material adhered or welded to the fabric or flexible composite material of the inflatable safety product creating a seam region, when separated from the fabric or flexible composite material of the inflatable safety product, at or about a 180° angle, at a separation rate of between 2 and 2.5 inches/minute, at a temperature between 70° F. to 72° F., wherein the average of at least 5 specimens must resist separation with a force of 5 pounds/inch width or greater. The aforementioned resistance to separation, described herein peel strength as referenced in TSOs, such as but not limited to TSO-C69c from the FAA.

As a further non-limiting example, any coatings, films, or layers applied to the substrate of the fabric or flexible composite material, when separated from the substrate or other layers used in the construction of the fabric or flexible composite material, of the inflatable safety product, at or about a 1800 angle, at a separation rate of between 2 and 2.5 inches/minute, at a temperature of between 70° F. to 72° F., wherein the average of at least 5 specimens must resist separation with a force of 5 pounds/inch width or greater. The aforementioned resistance to separation, described herein ply adhesion and coating adhesion as referenced in TSOs, such as but not limited to TSO-C69c from the FAA.

Seam Shear

TSO-C69c Requirement

As a non-limiting example, the fabric or flexible composite material adhered or welded to the fabric or flexible composite material of the inflatable safety product creating a seam region, when used to create a specimen of the seam region and with the fabric or flexible composite material adhered or welded with a ¾ inch maximum overlap, at a separation rate between 11.5 and 12.5 inches/minute, at a temperature of 75° F., wherein the average of at least 3 specimens must resist separation with a force of 175 pounds/inch width or greater when pulled in the shear direction.

As a further non-limiting example, the fabric or flexible composite material adhered or welded to the fabric or flexible composite material of the inflatable safety product creating a seam region, when used to create a specimen of seam region 2 inches in length and with the fabric or flexible composite material adhered or welded at a ¾ inch maximum overlap, at a separation rate of between 11.5 and 12.5 inches/minute, at a temperature of 140° F., wherein the average of at least 3 specimens must resist separation with a force of 40 pounds/inch width or greater when the pulled in the shear direction. The aforementioned resistance to separation, describes shear strength as referenced in TSOs, such as but not limited to TSO-C69c from the FAA.

Tensile and Tear Strength

TSO-C69c Requirement

As a non-limiting example, the fabric or flexible composite material of the inflatable safety product, when at least 5 specimens prepared as per Federal Test Method Standard—Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard—Method 5136 (Trapezoid Test), are placed between 2 jaws that are 1 inch apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging (exposed to a temperature of 158±4° F. for not less than 168 hours), the fabric or flexible composite of the inflatable safety product, when at least 5 specimens prepared as per Federal Test Method Standard—Method 5134 (Tongue Test), are placed between 2 jaws that are 3 inches apart and subjected to a separation rate of between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5136 (Trapezoid Test), are placed between 2 jaws that are 1 inch apart and subjected to a separation rate between 11.5 and 12.5 inches/minute, at a temperature of 68° F. to 72° F., must a resist separation with a maximum force of an average of at least 13 pounds/inch in warp direction and fill direction (along the manufacturing length and width of the fabric or flexible composite material).

As a non-limiting example, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must resist separation with a maximum force of an average of at least 190 pounds/inch in warp direction and fill direction (along the manufacturing length and width of the fabric or flexible composite material).

As a further non-limiting example, after aging, the fabric or flexible composite material of the inflatable safety product, when at least 5 specimens prepared as per Federal Test Method Standard—Method 5100 (Grab Test), are placed between 2 jaws that are 3 inches apart and subjected to a separation rate between 11.5 and 12.5 inches/minute, at a temperature of 68° F. to 72° F., must a resist separation with a maximum force of an average of at least 190 pounds/inch in warp direction and fill direction (along the manufacturing length and width of the fabric or flexible composite material).

Air Holding & Gas Holding
TSO-C69c Requirement

As a non-limiting example, the fabric or flexible composite material, described herein when configured into an inflatable safety product must withstand a pressure of at least 1.5 times the maximum operating pressure for at least 5 minutes of its intended use.

As a further non-limiting example, the fabric or flexible composite material, described herein when configured into an inflatable safety product must withstand a pressure of at least 2 times the maximum operating pressure for at least 1 minute, of its intended use.

As a further non-limiting example, the fabric or flexible composite material, described herein when configured into an inflatable safety inflatable safety product, when inflated to its operating pressure of intended use must not fall below at least 50 percent of its initial pressure in a period less than 12 hours.

As a further non-limiting example, the fabric or flexible composite material, described herein when configured into an inflatable safety product, that is capable of being used as a life raft or flotation device when inflated to its operating pressure of intended use must not fall below the minimum raft mode operating pressure in less than 24 hours.

Helium Permeability
TSO-C69c Requirement

As a non-limiting example, the fabric or flexible composite material of the inflatable safety product, when at least 3 specimens are prepared and tested as per Federal Test Method Standard—Method 5460 or ASTM Method D1434-82, Procedure V, have a maximum permeability of Helium of 10 liters per square meter in 24 hours at 77° F. or its equivalent in Hydrogen when a pressure is applied to the chamber on the side of the test specimen that separates the test gas (Helium or its equivalent in Hydrogen) from the chamber receiving the permeating gas.

Temperature Resistance
TSO-C69c Requirement:

As a non-limiting example, the fabric or flexible composite material, seam tape, accessory material and or product accessories described herein when exposed to temperatures from −40° F. to 160° F. must remain fully functioning per its intended use as referenced in TSOs, such as but not limited to TSO-C69c from the FAA.

As a further non-limiting example, the fabric or flexible composite material, seam tape, accessory material and or product accessories described herein must remain fully functioning per its intended use after exposure to a storage temperature of 185° F. or greater as referenced in TSOs, such as but not limited to TSO-C69c from the FAA.

As a further non-limiting example, the fabric or flexible composite material, seam tape, accessory material and or product accessories described herein must remain fully functioning per its intended use after being stowed at a temperature −65° F. or less as referenced in TSOs, such as but not limited to TSO-C69c from the FAA.

Radiant Heat Resistance
TSO-C69c Requirement

As a further non-limiting example, the fabric or flexible composite material described herein when exposed to a radiant heat flux of 1.5 $Btu/ft^2$-sec or greater, wherein a pressure applied to the surface opposite the heat source does not decrease for at least 90 seconds when the surface opposite the heat source is subjected to a higher pressure than the surface subjected to the heat source, wherein the average of the time to pressure decrease of at least 3 specimens of the fabric or flexible composite is at least 180 seconds or greater.

Fluids Exposure
TSO-C70b Requirement

As a further non-limiting example, the fabric or flexible composite material described herein must be capable of withstanding the detrimental effects of exposure to fuels, oils, hydraulic fluids, and sea water. After being exposed to fuels, oils, hydraulic fluids, and sea water, a seam will not have a decrease in seam strength or coat adhesion of more than 10%.

As a further non-limiting example, the fabric or flexible composite material, described herein must remain capable of withstanding the detrimental effects of exposure to fuels, oils, hydraulic fluids, and sea water with no loss in air holding or gas holding properties. After being exposed to fuels, oils, hydraulic fluids, and sea water, the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C70b from the FAA.

Hydrolysis
TSO-C69c Requirement

As a further non-limiting example, the fabric or flexible composite material, described herein must remain capable of withstanding the detrimental effects of hydrolysis exposure to a temperature of 136±4° F. at a relative humidity of 95±4 percent for a period of 50 days with no loss in air holding or gas holding properties. After hydrolysis exposure to a temperature of 136±4° F. at a relative humidity of 95±4 percent for a period of 50 days the fabric or flexible composite material, wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 20% as referenced in TSOs, such as but not limited to TSO-C69c from the FAA.

Tear Propagation
TSO-C69c Requirement

As a non-limiting example, the fabric or flexible composite material, described herein when must not allow a tear to propagate beyond the implement that caused an initial puncture or tear as referenced in TSOs, such as but not limited to TSO-C69c from the FAA.

Accelerated Aging
TSO-C69c Requirement

As a further non-limiting example, the fabric or flexible composite material, described herein must remain capable of withstanding the detrimental effects of accelerated aging at a temperature of 158±4° F. for not less than 168 hours with no loss in air holding or gas holding properties. After accelerated aging at a temperature of 158±4° F. for not less than 168 hours the fabric or flexible composite material, seam tape, accessory material wherein the average of at least 5 specimens in warp direction and fill direction (along the manufacturing length and width of the fabric or flexible composite material) will not have a decrease in coating adhesion, ply adhesion, peel strength, seam shear strength, tensile strength, or tear strength of more than 10% as referenced in TSOs, such as but not limited to TSO-C69c from the FAA.

Flammability
TSO-C69c Requirement

As a non-limiting example, the fabric or flexible composite material, described herein, wherein the average of at least 3 specimens in warp direction and fill direction (along the manufacturing length and width of the fabric or flexible composite material material) are located ¾ inches above the top edge of a burner apparatus, for a period of 12 seconds is exposed to a flame with a total length of 1.5 inches and an inner cone length of ⅞ inches, and minimum temperature of 1550° F., shall not burn for more than 15 seconds after the flame is removed, shall not burn more than 8 inches in the vertical direction, wherein any material that drips form the specimen shall not burn to more than 5 seconds, as referenced such as but not limited to the flammability requirements of 14 CFR part 25.853(a), Appendix F, Part I (a)(1)(ii) as referenced in TSOs, such as but not limited to TSO-C69c from the FAA.

EXAMPLES

A collection of exemplary embodiments is provided below, including at least some explicitly enumerated as "Examples" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Example 1. A seam tape, accessory material, or component material for an inflatable safety product, the seam tape, accessory material, or component material comprising a hot melt adhesive configured to adhere the seam tape, accessory material, or component material to a fabric or flexible composite material of the inflatable safety product.

Example 2. The seam tape, accessory material, or component material of any of the preceding or subsequent examples or combination of examples, wherein the seam tape, accessory material, or component material comprises a substrate with a metallic layer covering at least one surface of the substrate.

Example 3. The seam tape, accessory material, or component material of any of the preceding or subsequent examples or combination of examples, wherein the fabric or flexible composite material of the inflatable safety product comprises a metallic layer and the hot melt adhesive adheres the seam tape, accessory material, or component material to the metallic layer.

Example 4. The fabric or flexible composite material of the inflatable safety product of any of the preceding or subsequent examples or combination of examples, wherein the metallic layer is covered by an exterior layer to prevent damage, oxidation and/or corrosion of the metallic layer.

Example 5. The fabric or flexible composite material of the inflatable safety product of any of the preceding or subsequent examples or combination of examples, wherein the metallic layer is covered by an exterior layer to prevent deterioration of the fabric or flexible composite material due to hydrolysis.

Example 6. The fabric or flexible composite material of the inflatable safety product of any of the preceding or subsequent examples or combination of examples, wherein the metallic layer is covered by an exterior layer to promote adhesion to the metallic layer.

Example 7. The fabric or flexible composite material of the inflatable safety product of any of the preceding or subsequent examples or combination of examples, wherein the metallic layer is covered by an exterior layer to improve the durability of the metallic layer.

Example 8. The seam tape, accessory material, or component material of any of the preceding or subsequent examples or combination of examples, wherein the fabric or flexible composite material of the inflatable safety product comprises a non-metallic surface and the hot melt adhesive adheres the seam tape, accessory material, or component material to the non-metallic surface.

Example 9. The seam tape, accessory material, or component material of any of the preceding or subsequent examples or combination of examples, wherein the hot melt adhesive is solvent-free.

Example 10. The seam tape, accessory material, or component material of any of the preceding or subsequent examples or combination of examples, wherein the hot melt adhesive maintains seam adhesion when exposed to a heat source, aging, hydrolysis, humidity, or fluids exposure.

Example 11. The seam tape, accessory material, or component material of any of the preceding or subsequent examples or combination of examples, wherein the hot melt adhesive maintains gas barrier properties when exposed to a heat source, aging, hydrolysis, humidity, or fluids exposure.

Example 12. The seam tape, accessory material, or component material of any of the preceding or subsequent examples or combination of examples, where the hot melt adhesive is a thermoplastic hot melt adhesive, a thermoset hot melt adhesive, or a reactive hot melt adhesive.

Example 13. The seam tape, accessory material, or component material of any of the preceding or subsequent examples or combination of examples, wherein the hot melt adhesive is solvent-free.

Example 14. The seam tape, accessory material, or component material of any of the preceding or subsequent examples or combination of examples, wherein the hot melt adhesive maintains seam shear when exposed to a heat source, aging, hydrolysis, humidity, or fluids exposure.

Example 15. The seam tape, accessory material, or component material of any of the preceding or subsequent examples or combination of examples, wherein the seam tape, accessory material, or component material and the fabric or flexible composite material of the inflatable safety product each comprise an emissivity value of 0.48 or less.

Example 16. The seam tape, accessory material, or component material of any of the preceding or subsequent examples or combination of examples, wherein the fabric or flexible composite material of the inflatable safety product comprises at least one of a polyethylene substrate, a metallic surface, or an emissivity value of 0.48 or less.

Example 17. The seam tape, accessory material, or component material of any of the preceding or subsequent examples or combination of examples, wherein the seam tape, accessory material, or component material comprises an emissivity of less than or equal to 0.48.

Example 18. The seam tape, accessory material, or component material of any of the preceding or subsequent examples or combination of examples, wherein the seam tape, accessory material, or component material comprises an emissivity of less than or equal to 0.25.

Example 19. The seam tape, accessory material, or component material of any of the preceding or subsequent examples or combination of examples, wherein the fabric or flexible composite material of the inflatable safety product comprises an emissivity value of 0.25 or less.

Example 20. The seam tape, accessory material, or component material of any of the preceding or subsequent examples or combination of examples, wherein the seam tape, accessory material, or component material and the fabric or flexible composite material of the inflatable safety product each comprise an emissivity value of 0.48 or less.

Example 21. The seam tape, accessory material, or component material of any of the preceding or subsequent examples or combination of examples, wherein the seam tape, accessory material, or component material comprises a polyethylene substrate, ultra-high molecular weight polyethylene substrate, polypropylene substrate, polyester substrate, polyamide substrate, aromatic polyamide substrate, aramid substrate, polyolefin substrate, aromatic polyester substrate, polyarylate substrate, other liquid crystal polymers substrate, or nylon substrate.

Example 22. An inflatable safety product comprising: a first panel; an adjacent second panel, the first panel and the second panel forming a seam region; and the seam tape of any of the preceding or subsequent examples or combination of examples, wherein the seam tape joins the first panel and the second panel in the seam region.

Example 23. The inflatable safety product of any of the preceding or subsequent examples or combination of examples, wherein a gap is defined between the first panel and the adjacent second panel, and wherein the seam tape covers the gap.

Example 24. The inflatable safety product of any of the preceding or subsequent examples or combination of examples, wherein the inflatable safety product comprises an inflatable evacuation slide, inflatable evacuation slide/raft, inflatable evacuation ramp, inflatable evacuation slide/ramp, life raft, life vest, or helicopter float.

Example 25. An accessory or component for an inflatable safety product comprising the accessory material or component of any of the preceding or subsequent examples or combination of examples, wherein the accessory or component is a floor, sliding surface, patch, girt, handle, structural attachment, or pouch.

Example 26. The inflatable safety product of any of the preceding or subsequent examples or combination of examples, wherein the first panel, the second panel, and the seam tape each comprise an emissivity value of 0.48 or less.

Example 27. A seam tape, accessory material, or component material for an inflatable safety product, the seam tape, accessory material, or component material comprising an emissivity of less than or equal to 0.48 and a hot melt adhesive, the hot melt adhesive configured to adhere the seam tape, accessory material, or component material to a fabric or flexible composite material of the inflatable safety product.

Example 28. The seam tape, accessory material, or component material of any of the preceding or subsequent examples or combination of examples, wherein the fabric or flexible composite material of the inflatable safety product comprises an emissivity of less than or equal to 0.48.

Example 29. The seam tape, accessory material, or component material of any of the preceding or subsequent examples or combination of examples, wherein the hot melt adhesive is a solvent-free thermoplastic hot melt adhesive.

Example 30. The seam tape, accessory material, or component material of any of the preceding or subsequent examples or combination of examples, wherein the hot melt adhesive is a solvent-free thermoset hot melt adhesive.

Example 31. A method of constructing an inflatable safety product, the method comprising adhering a seam tape, accessory, or component to at least one panel of the inflatable safety product, wherein the seam tape, accessory or component comprises a hot melt adhesive adhering the seam tape, accessory, or component to the at least one panel, and wherein the seam tape, accessory, or component comprises an emissivity of 0.48 or less.

Example 32. The method of any of the preceding or subsequent examples or combination of examples, wherein the seam tape, accessory, or component is adhered using heat and pressure.

Example 33. The method of any of the preceding or subsequent examples or combination of examples, wherein the at least one panel comprises a first panel and a second panel, wherein the method comprises adhering welding the first panel and the second panel in a seam region formed by the first panel and the second panel using the seam tape.

Example 34. The method of any of the preceding or subsequent examples or combination of examples, wherein the at least one panel comprises an emissivity of 0.48 or less.

Example 35. The method of any of the preceding or subsequent examples or combination of examples, wherein the joined at least one panel and seam tape, accessory or component comprises an emissivity of 0.25 or less.

Example 36. The method of any of the preceding or subsequent examples or combination of examples, wherein the hot melt adhesive is a solvent-free thermoplastic hot melt adhesive.

Example 37. The method of any of the preceding or subsequent examples or combination of examples, wherein the hot melt adhesive is a solvent-free thermoset hot melt adhesive.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

The use of the terms "a" and "an" and "the" and similar referents in the context of describing the invention (especially in the context of the following claims) are to be construed to cover both the singular and the plural, unless otherwise indicated herein or clearly contradicted by context. Directional references such as "up," "down," "top," "bottom," "left," "right," "front," and "back," among others, are intended to refer to the orientation as illustrated and described in the figure (or figures) to which the components and directions are referencing. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, the nearness of completion will be so as to have the same overall result as if absolute and total completion were obtained.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

That which is claimed is:

1. A seam tape, accessory material, or component material for an inflatable safety product, the seam tape, accessory material, or component material comprising:
   a substrate of a flexible composite or fabric material, the substrate comprising a first side and a second side, and the substrate comprising polypropylene, polyarylate, polyamide, polyethylene, ultra-high molecular weight polyethylene, or liquid crystal polymer;

a hot melt adhesive layer on at least one of the first side or the second side of the substrate, wherein the hot melt adhesive is adhered to the substrate using only heat and pressure, wherein the hot melt adhesive layer is configured to adhere the seam tape, accessory material, or component material to a fabric or flexible composite material panel of the inflatable safety product, wherein the hot melt adhesive is a thermoplastic hot melt adhesive, a thermoset hot melt adhesive, or a reactive hot melt adhesive, and wherein the seam tape, accessory material, or component material comprises a material weight less than 8 ounces/yd$^2$; and a gas barrier film applicable to one or more surfaces of the substrate using the hot melt adhesive.

2. The seam tape, accessory material, or component material of claim 1, further comprising a metallic layer covering at least one of the first side or the second side of the substrate.

3. The seam tape, accessory material, or component material of claim 1, wherein the fabric or flexible composite material of the inflatable safety product comprises a metallic layer and the hot melt adhesive adheres the seam tape, accessory material, or component material to the metallic layer.

4. The fabric or flexible composite material of the inflatable safety product of claim 3, wherein the metallic layer is covered by an exterior layer to prevent damage, oxidation and/or corrosion of the metallic layer.

5. The fabric or flexible composite material of the inflatable safety product of claim 3, wherein the metallic layer is covered by an exterior layer to prevent deterioration of the fabric or flexible composite material due to hydrolysis.

6. The fabric or flexible composite material of the inflatable safety product of claim 3, wherein the metallic layer is covered by an exterior layer to promote adhesion to the metallic layer.

7. The fabric or flexible composite material of the inflatable safety product of claim 3, wherein the metallic layer is covered by an exterior layer to improve a durability of the metallic layer.

8. The seam tape, accessory material, or component material of claim 1, wherein the fabric or flexible composite material of the inflatable safety product comprises a non-metallic surface and the hot melt adhesive adheres the seam tape, accessory material, or component material to the non-metallic surface.

9. The seam tape, accessory material, or component material of claim 1, wherein the hot melt adhesive is solvent-free.

10. The seam tape, accessory material, or component material of claim 1, wherein the hot melt adhesive maintains seam adhesion when exposed to a heat source, aging, hydrolysis, humidity, or fluids exposure.

11. The seam tape, accessory material, or component material of claim 1, wherein the hot melt adhesive maintains gas barrier properties when exposed to a heat source, aging, hydrolysis, humidity, or fluids exposure.

12. The seam tape, accessory material, or component material of claim 1, wherein the hot melt adhesive maintains seam shear when exposed to a heat source, aging, hydrolysis, humidity, or fluids exposure.

13. The seam tape, accessory material, or component material of claim 1, wherein the seam tape, accessory material, or component material and the fabric or flexible composite material of the inflatable safety product each comprise an emissivity value of 0.48 or less.

14. The seam tape, accessory material, or component material of claim 1, wherein the fabric or flexible composite material of the inflatable safety product comprises at least one of a polyethylene substrate, a metallic surface, or an emissivity value of 0.48 or less.

15. The seam tape, accessory material, or component material of claim 1, wherein the seam tape, accessory material, or component material comprises an emissivity of less than or equal to 0.48.

16. The seam tape, accessory material, or component material of claim 1, wherein the seam tape, accessory material, or component material comprises an emissivity of less than or equal to 0.25.

17. An inflatable safety product comprising:

a first panel having a first substrate that comprises polypropylene, polyarylate, polyamide, polyethylene, ultra-high molecular weight polyethylene, or liquid crystal polymer;

a second panel adjacent to the first panel, wherein the first panel and the second panel form a seam region, and wherein the second panel has a second substrate that comprises polypropylene, polyarylate, polyamide, polyethylene, ultra-high molecular weight polyethylene, or liquid crystal polymer; and the seam tape of claim 1, wherein the seam tape joins the first panel and the second panel in the seam region.

18. The inflatable safety product of claim 17, wherein a gap is defined between the first panel and the adjacent second panel, and wherein the seam tape covers the gap.

19. The inflatable safety product of claim 17, wherein the inflatable safety product comprises an inflatable evacuation slide, inflatable evacuation slide/raft, inflatable evacuation ramp, inflatable evacuation slide/ramp, life raft, life vest, or helicopter float.

20. An accessory or component for an inflatable safety product comprising the accessory material or component material of claim 17, wherein the accessory or component is a patch, girt, handle, structural attachment, or pouch.

21. The inflatable safety product of claim 20, wherein the first panel, the second panel, and the seam tape each comprise an emissivity value of 0.48 or less.

22. A seam tape, accessory material, or component material for an inflatable safety product, the seam tape, accessory material, or component material comprising:

a substrate that includes polypropylene, polyarylate, polyamide, polyethylene, ultra-high molecular weight polyethylene, or liquid crystal polymer, the seam tape, accessory material, or component material comprising an emissivity of less than or equal to 0.48;

a hot melt adhesive, the hot melt adhesive configured to adhere the seam tape, accessory material, or component material to a fabric or flexible composite material of the inflatable safety product, wherein the seam tape, accessory material, or component material comprises a radiant heat resistance of at least 180 seconds, when exposed to radiant heat flux of 1.5 Btu/ft$^2$-sec or greater, for at least 180 seconds; and a gas barrier film applicable to one or more surfaces of the substrate using the hot melt adhesive.

23. The seam tape, accessory material, or component material of claim 22, wherein the fabric or flexible composite material of the inflatable safety product comprises an emissivity of less than or equal to 0.48.

24. The seam tape, accessory material, or component material of claim 22, wherein the hot melt adhesive is a solvent-free thermoplastic hot melt adhesive.

25. The seam tape, accessory material, or component material of claim 22, wherein the hot melt adhesive is a solvent-free thermoset hot melt adhesive.

26. A seam tape, accessory material, or component material for an inflatable safety product, the seam tape, accessory material, or component material comprising:
- a substrate comprising a fabric or flexible composite material, the fabric or flexible composite material comprising polyethylene, ultra-high molecular weight polyethylene, polypropylene, polyamide, polyarylate, or liquid crystal polymer;
- a solvent-free hot melt adhesive on the substrate, the solvent-free hot melt adhesive configured to adhere the seam tape, accessory material, or component material to a fabric or flexible composite material of the inflatable safety product; and
- a gas barrier film applicable to one or more surfaces of the substrate using the solvent-free hot melt adhesive.

\* \* \* \* \*